United States Patent
Iikura et al.

(10) Patent No.: US 10,884,777 B2
(45) Date of Patent: Jan. 5, 2021

(54) APPARATUS AND METHOD TO PREDICT A TIME INTERVAL TAKEN FOR A LIVE MIGRATION OF A VIRTUAL MACHINE

(71) Applicant: FUJITSU LIMITED, Kawasaki (JP)

(72) Inventors: Fumi Iikura, Shinagawa (JP); Yukihiro Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 266 days.

(21) Appl. No.: 16/131,091

(22) Filed: Sep. 14, 2018

(65) Prior Publication Data

US 2019/0095233 A1 Mar. 28, 2019

(30) Foreign Application Priority Data

Sep. 22, 2017 (JP) ................. 2017-182672

(51) Int. Cl.

| G06F 9/455 | (2018.01) |
|---|---|
| G06F 9/50 | (2006.01) |
| G06F 11/30 | (2006.01) |
| G06K 9/62 | (2006.01) |

(52) U.S. Cl.
CPC ........ G06F 9/45558 (2013.01); G06F 9/5088 (2013.01); G06F 11/301 (2013.01); G06K 9/6215 (2013.01); *G06F 2009/4557* (2013.01)

(58) Field of Classification Search
CPC .. G06F 9/45558; G06F 9/5088; G06F 11/301; G06F 2009/4557; G06K 9/6215
See application file for complete search history.

(56) References Cited

U.S. PATENT DOCUMENTS 10,108,517 B1 * 10/2018 Efremov et al. ...... G06F 11/301
718/104

FOREIGN PATENT DOCUMENTS

| JP | 2009-146161 | 7/2009 |
|---|---|---|
| JP | 2016-184252 | 10/2016 |

OTHER PUBLICATIONS

Sherif Akoush et al., "Predicting the Performance of Virtual Machine Migration", IEEE International Symposium on Modeling, Analysis and Simulation of Computer and Telecommunication Systems (MASCOT), 2010 (10 pages).

Jinshi Zhang et al., "MigVisor: Accurate Prediction of VM Live Migration Behavior using a Working-Set Pattern Model", ACM VEE, 2017, pp. 30-43 (14 pages).

* cited by examiner

*Primary Examiner* — Wissam Rashid
(74) *Attorney, Agent, or Firm* — Fujitsu Patent Center

(57) ABSTRACT

An apparatus extracts, for each virtual machine, a first time at which a first live migration has been performed and a first time-interval that has been taken for the first live migration, from log information storing events of the first live migration. The apparatus extracts, for each virtual machine, load information from a load history in which the load information including a CPU usage rate and a memory usage amount is stored at predetermined intervals for each virtual machine, and generates a model that predicts a second time-interval to be taken for a second live migration expected to be performed for each virtual machine, from the load information at the first time and the first time-interval. Upon receiving an instruction for predicting the second time-interval, the apparatus predicts the second time-interval from the model, and provides the predicted second time-interval to be taken for the second live migration.

5 Claims, 24 Drawing Sheets

FIG. 2

| TIME | EVENT |
|---|---|
| 6/20/2017 1:00 | START LM OF VM keiri-DB-12 |
| 6/20/2017 1:05 | END LM OF VM keiri-DB-12 |
| ... | ... |

FIG. 3

VM keiri-db-12

| TIME | CPU USAGE RATE (%) | MEMORY USAGE AMOUNT (GB) | NW IO (Mbps) | DISK IO (Mbps) |
|---|---|---|---|---|
| 6/20/2017 1:00 | 30 | 1 | 25 | 35 |
| ... | ... | ... | ... | ... |

FIG. 4

WHEN PERIOD IS ONE DAY

| TIME SLOT | CPU USAGE RATE | MEMORY USAGE AMOUNT | NW IO | DISK IO |
|---|---|---|---|---|
| 0:00 | x0 | y0 | z0 | w0 |
| ... | ... | ... | ... | ... |
| 23:00 | x23 | y23 | z23 | w23 |

PAST LOAD INFORMATION OF keiri-db-12                                          35

| TIME | CPU USAGE RATE (%) | MEMORY USAGE AMOUNT (GB) | NW IO (Mbps) | DISK IO (Mbps) |
|---|---|---|---|---|
| 6/20/2017 1:00 | 30 | 1 | 25 | 35 |
| ... | ... | ... | ... | ... |

LOAD PATTERN OF keiri-db-12
(WHEN PERIOD IS ONE DAY)                                                       21

| TIME SLOT | CPU USAGE RATE | MEMORY USAGE AMOUNT | NW IO | DISK IO |
|---|---|---|---|---|
| 0:00 | x0 | y0 | z0 | w0 |
| ... | ... | ... | ... | ... |
| 23:00 | x23 | y23 | z23 | w23 |

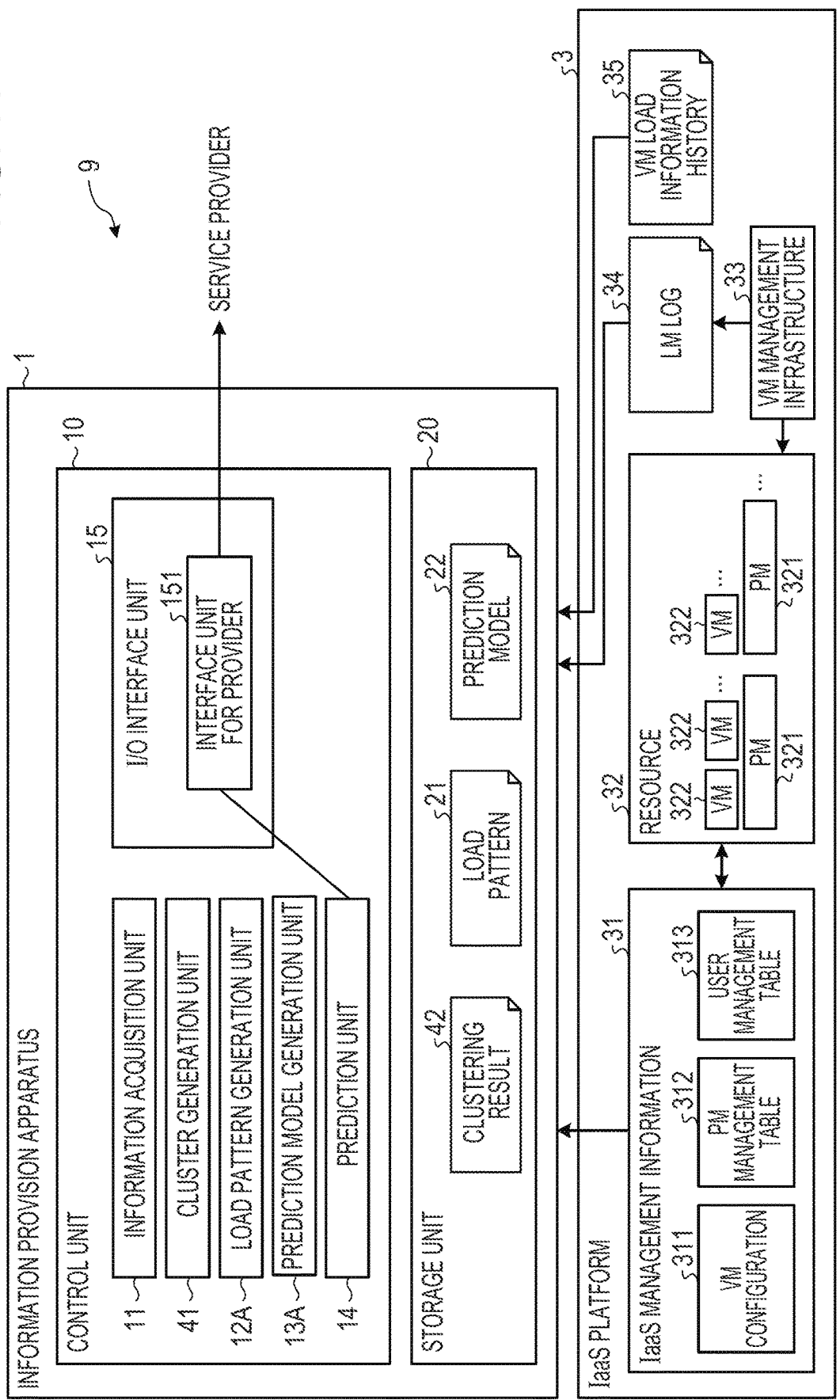

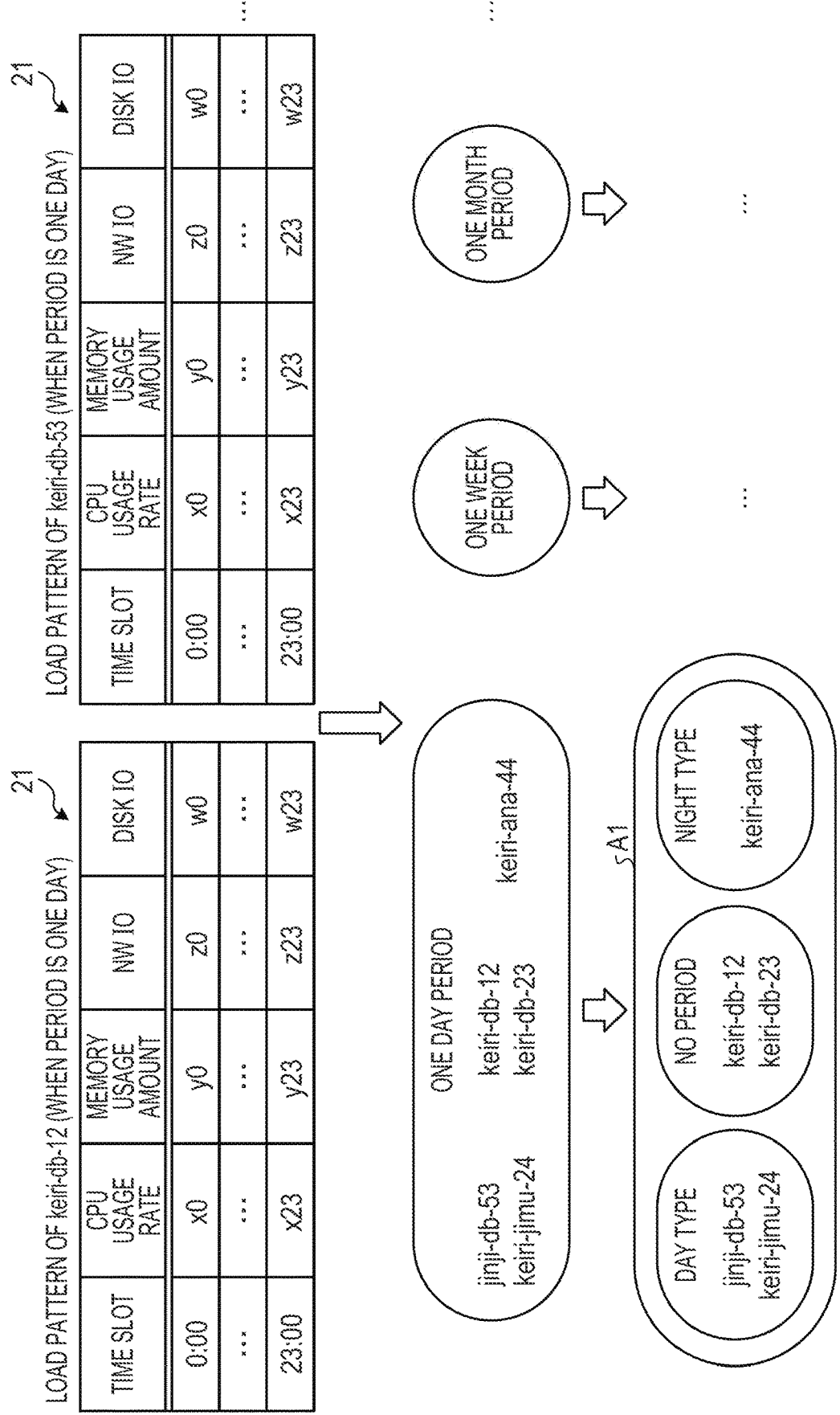

FIG. 12B

| | VM NAME | SIZE | SIZE TYPE |
|---|---|---|---|
| ○ | keiri-db-12 | 4 VCPU CORES, 4 GB MEMORY | C4M4 |
| ○ | keiri-db-23 | 4 VCPU CORES, 4 GB MEMORY | C4M4 |
| △ | keiri-jimu-24 | 4 VCPU CORES, 2 GB MEMORY | C4M2 |
| □ | keiri-ana-44 | 8 VCPU CORES, 4 GB MEMORY | C8M4 |
| ○ | jinji-db-53 | 4 VCPU CORES, 4 GB MEMORY | C4M4 |

FIG. 12C

| VM NAME | WORD ELEMENTS |
|---|---|
| keiri-db-12 | keiri, db, 12 |
| keiri-db-23 | keiri, db, 23 |
| jinji-db-53 | jinji, db, 53 |

CALCULATE LEVENSHTEIN DISTANCE
(WHERE DISTANCE IS DEFINED BY NUMBER OF DIFFERENT WORD ELEMENTS)

|  | keiri-db-12 | keiri-db-23 | jinji-db-53 |
|---|---|---|---|
| keiri-db-12 |  | 1 | 2 |
| keiri-db-23 |  |  | 2 |
| jinji-db-53 |  |  |  |

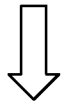

GENERATE CLUSTERS FROM DISTANCE    NAME PATTERN

A2

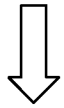

| CLUSTER NAME | SIZE TYPE | NAME PATTERN |
|---|---|---|
| keiri-db | C4M4 | keiri-db-?? |
| jinji-db | C4M4 | jinji-db-?? |
| keiri-jimu | C4M2 | keiri-jimu-?? |
| keiri-ana | C8M4 | keiri-ana-?? |

APPARATUS AND METHOD TO PREDICT A TIME INTERVAL TAKEN FOR A LIVE MIGRATION OF A VIRTUAL MACHINE

CROSS-REFERENCE TO RELATED APPLICATION

This application is based upon and claims the benefit of priority of the prior Japanese Patent Application No. 2017-182672, filed on Sep. 22, 2017, the entire contents of which are incorporated herein by reference.

FIELD

The embodiments discussed herein are related to apparatus and method to predict a time interval taken for a live migration of a virtual machine.

BACKGROUND

In recent years, public cloud infrastructure as a service (IaaS) has been widely used, which is one of cloud computing technologies and is a service for renting a virtual machine via the Internet utilizing virtualization technology. In the public cloud, a service provider manages a physical machine, and rents a virtual machine to be performed by a physical machine via the Internet. A user then manages the rented virtual machine.

Here, maintenance of a physical machine may be performed by the service provider. In the maintenance, for instance, an operating system (OS) of the physical machine is upgraded. When maintenance is performed, the service provider migrates a virtual machine running in a physical machine to another physical machine, and performs maintenance of the physical machine without stopping the virtual machine. Migrating a virtual machine to another physical machine is referred to as "live migration". Such live migration is achieved by copying the contents of the memory of the virtual machine to a virtual machine on another physical machine.

There is a technique for determining a target virtual machine for migration when live migration is performed (see, for instance, Japanese Laid-open Patent Publication No. 2009-146161). In the technique, an update frequency and/or a referral frequency of the pages owned by each virtual machine are measured, and statistical information for the future is kept. A transfer time per page at the time of transfer processing of each virtual machine is measured, and statistical information for the future is kept. A time taken for transfer processing is calculated and estimated for each of virtual machines based on the statistical information on update frequency information and transfer times taken for transfer in the past, and a virtual machine which is estimated to have the shortest transfer time among all virtual machines is determined to be a target for migration.

In addition, there is a first technique for estimating a time taken for live migration (see, for instance, Japanese Laid-open Patent Publication No. 2016-184252). In the technique, when a live migration execution instruction is received from a user, transfer memory size information and transfer rate information are acquired from a transfer memory size storage unit and a transfer rate storage unit, respectively, and a transfer time taken for live migration is calculated.

In addition, there is a second technique for estimating a time taken for live migration (see, for instance, Predicting the Performance of Virtual Machine Migration, Akoush, et al., 2010 IEEE International Symposium on Modeling, Analysis and Simulation of Computer and Telecommunication Systems (MASCOT), and MigVisor: Accurate Prediction of VM Live Migration Behavior using a Working-Set Pattern Model, Zhang, et al., 2017 ACM VEE). In the technique, a time taken for live migration is estimated by utilizing an index called a page dirty rate of virtual machine. The page dirty rate refers to an index indicating a frequency of memory change, and is considered to be synonymous with a page update frequency of a technique for determining a virtual machine. It is to be noted that the page dirty rate is information retrieved from a virtual machine. Thus, it is difficult for a service provider to retrieve the page dirty rate because a virtual machine is managed by a user.

SUMMARY

According to an aspect of the invention, an apparatus extracts, for each virtual machine, a first time at which a first live migration has been performed and a first time-interval that has been taken for the first live migration, from log information storing events of the first live migration. The apparatus extracts, for each virtual machine, load information from a load history in which the load information including a CPU usage rate and a memory usage amount is stored at predetermined intervals for each virtual machine, and generates a model that predicts a second time-interval to be taken for a second live migration expected to be performed for each virtual machine, from the load information at the first time and the first time-interval. Upon receiving an instruction for predicting the second time-interval, the apparatus predicts the second time-interval from the model, and provides the predicted second time-interval to be taken for the second live migration.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a table illustrating an example data structure of LM log;

FIG. 3 is a table illustrating an example data structure of VM load information history;

FIG. 4 is a table illustrating an example data structure of a load pattern;

FIG. 11 is a functional block diagram illustrating the configuration of an information provision system according to a second embodiment;

FIG. 12A is a flow diagram (1) illustrating an example of cluster generation processing;

FIG. 12B is a flow diagram (2) illustrating an example of cluster generation processing;

FIG. 12C is a flow diagram (3) illustrating an example of cluster generation processing;

DESCRIPTION OF EMBODIMENTS

In a public cloud, a first problem arises: it is difficult for a service provider to estimate a time taken for live migration. For example, since it is difficult for a service provider to retrieve a page update frequency and a page dirty rate from a virtual machine, it is difficult to estimate a time taken for live migration of a virtual machine as a maintenance target.

In addition, in a public cloud, a second problem arises: it is difficult to estimate a time taken for live migration for the future. In other words, the first technique and the second technique for live migration time estimation are techniques that estimate a time taken for live migration if performed at the present time, and not a time taken for live migration in the future after the present time.

In an aspect, it is aimed to estimate a time taken for live migration in a public cloud.

Hereinafter, embodiments of an information provision program, an information provision apparatus, and an information provision method disclosed by the present application will be described in detail with reference to the drawings. It is to be noted that the disclosure is not limited by the embodiments.

First Embodiment

[Configuration of Information Provision System]

Figure 1:
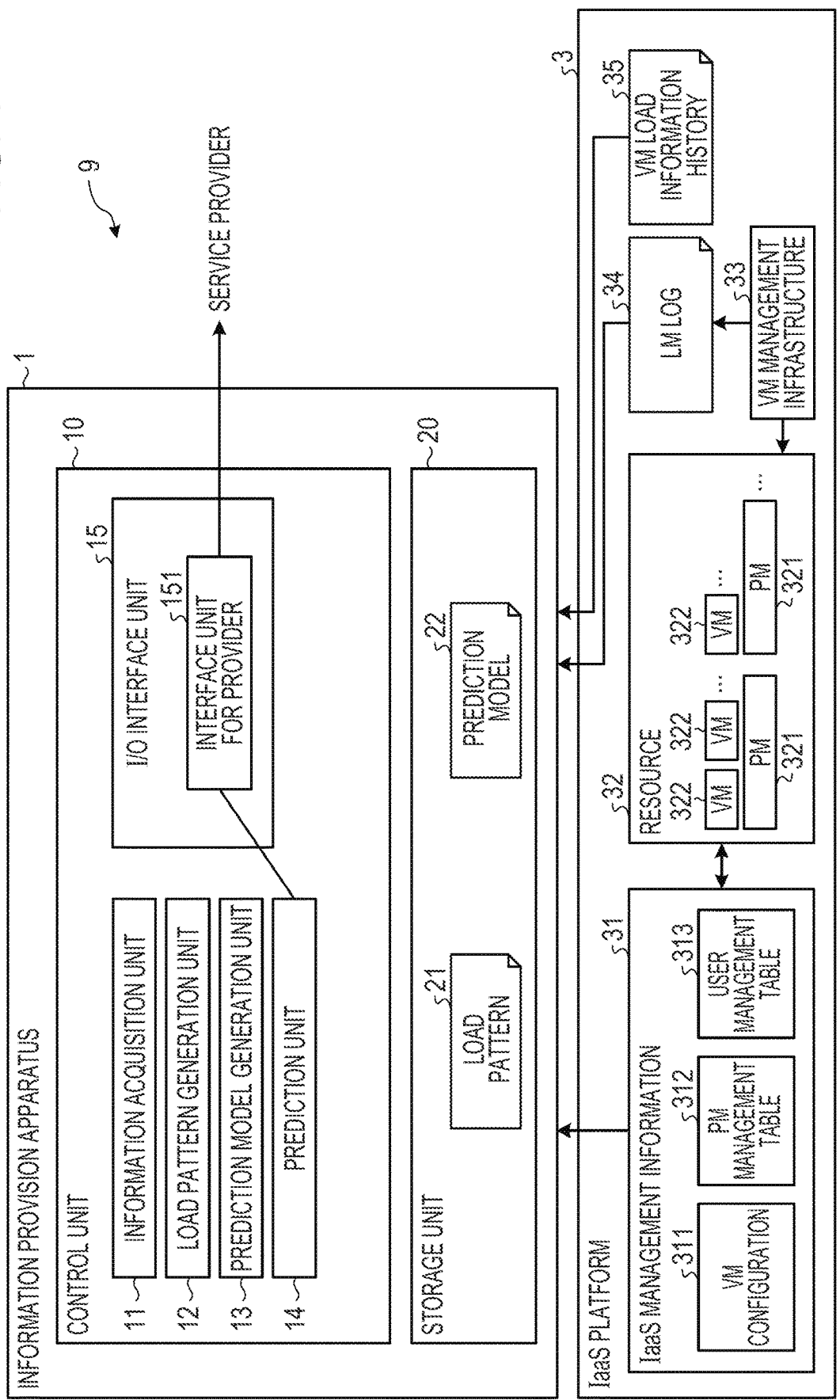
FIG. 1 is a functional block diagram illustrating the configuration of an information provision system according to a first embodiment.

FIG. 1 is a diagram illustrating the configuration of an information provision system according to a first embodiment. An information provision system 9 includes an information provision apparatus 1 and a public cloud (IaaS) platform 3. IaaS is a service for renting a virtual machine (VM) via the Internet utilizing virtualization technology. In the IaaS, a service provider manages a physical machine (PM), and rents a VM executed by the PM via the Internet. A user then manages the rented VM.

The IaaS platform 3 includes IaaS management information 31, a resource 32, a VM management platform 33, a live migration (LM) log 34, and a VM load information history 35.

The IaaS management information 31 is the management information to be used by the IaaS, and includes VM configuration 311, a PM management table 312, and a user management table 313. The VM configuration 311 is configuration of a VM. In the VM configuration 311, the number of usable virtual central processing units (CPU) and the number of usable virtual memories are managed for each VM. The PM management table 312 is a management table for a PM. In the PM management table 312, the VMs disposed for each PM are managed. The user management table 313 is a management table for users. In the user management table 313, the VMs managed by respective users are managed. It is to be noted that the IaaS management information 31 may include other management information in addition to the VM configuration 311, the PM management table 312, and the user management table 313. The other management information is, for instance, VM arrangement policy indicating a policy for arranging VMs, or a VSYS management table that manages the virtual systems used by the IaaS.

The resource 32 refers to PM 321 and VM 322 that run on the IaaS platform 3. The VM 322 is arranged on the PM 321 based on the PM management table 312. Also, when live migration is performed, the VM 322 is migrated from the PM 321 to another PM 321. The resource 32 is managed by the VM management platform 33.

The VM management platform 33 is a platform that manages the VM 322 arranged in the PM 321. For instance, the VM management platform 33 manages the VM 322 arranged in the PM 321 as well as live migration of the VM 322 by using the PM management table 312, and stores information at the time of live migration in the later-described LM log 34.

The LM log 34 is a history of events of live migration. Here, an example data structure of the LM log 34 will be described with reference to FIG. 2. FIG. 2 is a table illustrating an example data structure of the LM log. As illustrated in FIG. 2, the LM log 34 is the information in which time and event are associated with each other. Each time indicates a start time or a completion time of live migration. Each event relates to live migration. For instance, each event indicates a start event or an end event related to live migration of a target VM. As an example, when time is "6/20/2017 1:00", "START LM OF VM keiri-DB-12" is stored as the event. When time is "6/20/2017 1:05", "END LM OF VM keiri-DB-12" is stored as the event.

Returning to FIG. 1, the VM load information history 35 is a history of load information on a VM. The load information includes a CPU usage rate of a virtual CPU and a memory usage amount of a virtual memory of a VM. The load information is not limited to this, and may include information on a network input/output (IO) and a disk 10. In the embodiment, the load information is described as the CPU usage rate, memory usage amount, network IO, and disk IO.

Here, an example data structure of the VM load information history 35 will be described with reference to FIG. 3. FIG. 3 is a table illustrating an example data structure of the VM load information history. It is to be noted that the VM load information history is generated for each VM. The VM load information history 35 stores a time, a CPU usage rate, a memory usage amount, a NW IO, and a disk IO in association with each other. The time indicates a time when load information on a VM is extracted. It is sufficient that the time be at a time point every certain period. The certain period may be, for instance, one hour, or 30 minutes, and is predetermined but changeable. The CPU usage rate is a usage rate of a virtual CPU of a VM at a certain time. The memory usage amount is a usage amount of a virtual memory of a VM at a certain time. The NW IO is a time taken for the network IO of a VM at a certain time. The disk IO is a time taken for the disk IO of a VM at a certain time. As an example, when time is "6/20/2017 1:00", "30" % as the CPU usage rate, "1" GB as the memory usage amount, "25" Mbps as the NW IO, and "35" Mbps as the disk IO are stored.

The information provision apparatus 1 predicts the time taken for live migration of a VM arranged in a PM, and provides the predicted time. The information provision equipment 1 includes a control unit 10 and a storage unit 20.

The control unit 10 corresponds to an electronic circuit such as a central processing unit (CPU). The control unit 10 includes an internal memory for storing programs which specify various processing steps, and control data, and performs various types of processing by these programs and control data. The control unit 10 includes an information acquisition unit 11, a load pattern generation unit 12, a prediction model generation unit 13, a prediction unit 14, and an I/O interface unit 15. It is to be noted that the information acquisition unit 11 is an example of a first extraction unit and a second extraction unit. The prediction model generation unit 13 is an example of a generation unit. The prediction unit 14 is an example of a prediction unit. The I/O interface unit 15 is an example of a provision unit.

The storage units 20 is, for instance, a semiconductor memory device such as a random access memory (RAM), a flash memory, or a storage device such as a hard disk, an optical disc. The storage unit 20 includes a load pattern 21 and a prediction model 22.

The load pattern 21 indicates a pattern of load information on a VM identified from the VM load information history 35. The load pattern 21 is generated for each VM. It is to be noted that the load pattern 21 is generated by the load pattern generation unit 12.

The prediction model 22 is a model which is generated from the load pattern 21 and the LM log 34, and which predicts a time taken for live migration. The prediction model 22 is generated for each VM. It is to be noted that the prediction model 22 is generated by the prediction model generation unit 13.

The information acquisition unit 11 acquires load information for each VM in the past from the VM load information history 35 of the IaaS platform 3. In addition, from the LM log 34 of the IaaS platform 3, the information acquisition unit 11 acquires past LM information indicating times when live migration (LM) was performed and time intervals taken for LM for each VM.

The load pattern generation unit 12 generates a load pattern 21 for each VM.

For instance, when a request to generate the prediction model 22 is received, the load pattern generation unit 12 acquires past load information for each VM, which has been acquired by the information acquisition unit 11. The load information is the CPU usage rate, memory usage amount, NW IO, and disk IO. The load pattern generation unit 12 identifies a period of each load from load information for each of times in the past for each VM. The period of load may be, for instance, one day period, one week period, one month period, or no period. It is to be noted that the period of load may be statistically calculated and identified from load information at times in the past, and any technique in related art may be used.

In addition, the load pattern generation unit 12 divides the identified period for each VM, and generates a load pattern 21 that indicates average load information for each of division elements of the divided period. As an example, when the period is one day, the division elements of the period are assumed to be every hour during 24 hours, and the load pattern generation unit 12 may generate the load pattern 21 that indicates average load information every hour. Also, when the period is one week, the division elements of the period are assumed to be every day during the week, and the load pattern generation unit 12 may generate the load pattern 21 that indicates average load information every day. Also, when the period is one month, the division elements of the period are assumed to be every day during the month, and the load pattern generation unit 12 may generate the load pattern 21 that indicates average load information every day.

Here, an example data structure of the load pattern 21 will be described with reference to FIG. 4. FIG. 4 is a table illustrating an example data structure of the load pattern. As illustrated in FIG. 4, the load pattern 21 stores a time slot, a CPU usage rate, a memory usage amount, a NW IO, and a disk IO in association with each other. The time slot is a division element which varies with the period. The CPU usage rate is a usage rate of a virtual CPU. The memory usage amount is a usage amount of a virtual memory. The NW IO is a time taken for network IO. The disk IO is a time taken for disk IO. As an example, when the period is one day, the time slot indicates every hour during 24 hours. When the time slot indicates 0:00, "x0" as the CPU usage rate, "y0" as the memory usage amount, "z0" as the NW IO, and "w0" as the disk IO are stored.

The prediction model generation unit 13 generates a prediction model 22 for each VM for predicting a time taken for live migration of the VM. It is to be noted that the prediction model 22 may be generated regularly, for instance. For instance, the prediction model generation unit 13 performs the following processing for each VM. The prediction model generation unit 13 acquires times when live migration was performed and time intervals taken for live migration from the past LM information for a specific VM. The LM information indicates times when live migration was performed in the past and time intervals taken for live migration for each VM, the times and time intervals being acquired by the information acquisition unit 11. From the load pattern 21 for a specific VM, the prediction model generation unit 13 acquires load information corresponding to the times when live migration was performed. The load information is the CPU usage rate, memory usage amount, NW IO, and disk IO. The prediction model generation unit 13 then performs multiple regression analysis with the load information serving as the explanatory variable and the time taken for live migration serving as the objective variable, and generates a prediction model 22 for a specific VM.

Here, the prediction model 22 for a VM is generated based on the following expectation. For example, when the load on a VM is low, it is expected that the time taken for live migration (LM) is short. However, even though the load on a VM is high, if the frequency of memory change is low, it is expected that the time taken for LM is small. Thus, for a VM, the prediction model generation unit 13 records LM times and LM time intervals when LM was performed in the past, and generates a prediction model 22 for predicting an LM time interval based on the LM time intervals and the load information including the CPU usage rates and memory usage amounts at the LM times.

The prediction unit 14 predicts a time taken for live migration of a VM by using the prediction model 22 for the VM. For instance, when receiving a VM that performs live migration and scheduled date and time at which the live migration is performed, the prediction unit 14 acquires load information corresponding to the scheduled date and time from a load pattern 21 corresponding to the VM. The prediction unit 14 predicts the time taken for live migration on the scheduled date and time from the acquired load information by using the prediction model 22 for the VM.

The I/O interface unit 15 is an interface that performs communication via a network. The I/O interface unit 15 includes an interface unit 151 for provider. The interface unit 151 for provider provides a service provider with the time taken for live migration predicted by the prediction unit 14, via a network.

[Example of Load Pattern Generation Processing]

Figure 5:
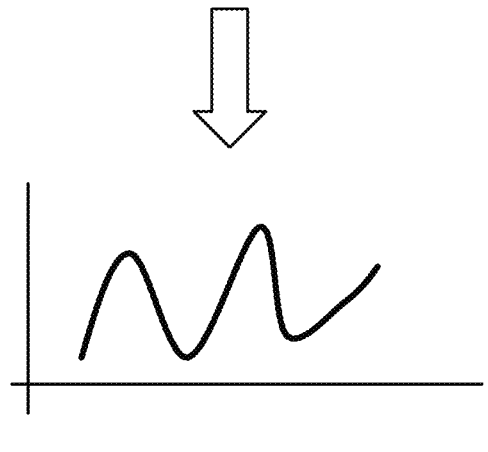
FIG. 5 is a flow diagram illustrating an example of load pattern generation processing.

Here, an example of load pattern generation processing will be described with reference to FIG. 5. FIG. 5 is a flow diagram illustrating an example of load pattern generation processing. In FIG. 5, the load pattern generation processing to generate the load pattern 21 for the VM with VM name of "keiri-db-12" will be described. As illustrated in FIG. 5, the load pattern generation unit 12 acquires past load information on the VM "keiri-db-12", which has been acquired from the VM load information history 35 by the information acquisition unit 11. The upper part of FIG. 5 illustrates the past load information on the VM "keiri-db-12".

The load pattern generation unit 12 then identifies the period of load from a periodic variation in the past load information on the VM "keiri-db-12". Here, it is assumed that the period of load of the VM "keiri-db-12" is one day period.

The load pattern generation unit 12 then divides the identified period for the VM "keiri-db-12", and generates a load pattern 21 that indicates average load information for each of division elements of the divided period. Here, since the period is one day, the division elements of the period are assumed to be every hour during 24 hours, and the load pattern generation unit 12 generates a load pattern 21 that indicates average load information every hour. For instance, for 0:00, the load pattern generation unit 12 acquires a CPU usage rate between 0:00 and 1:00 from the past load information, calculates an average value of the acquired CPU usage rate, and sets the load pattern 21 by using the calculated average value as the CPU usage rate at 0:00. For 1:00, the load pattern generation unit 12 acquires a CPU usage rate between 1:00 and 2:00 from the past load information, calculates an average value of the acquired CPU usage rate, and sets the load pattern 21 using the calculated average value as the CPU usage rate at 1:00. Similarly, the load pattern generation unit 12 calculates a CPU usage rate for each of 2:00 to 23:00, and sets the load pattern 21. Similarly, for the memory usage amount, NW IO, and disk IO, the load pattern generation unit 12 may calculate a memory usage amount, a NW IO, and a disk IO for each of 0:00 to 23:00, and may set the load pattern 21.

[Example of Prediction Model Generation Processing]

Figure 6:
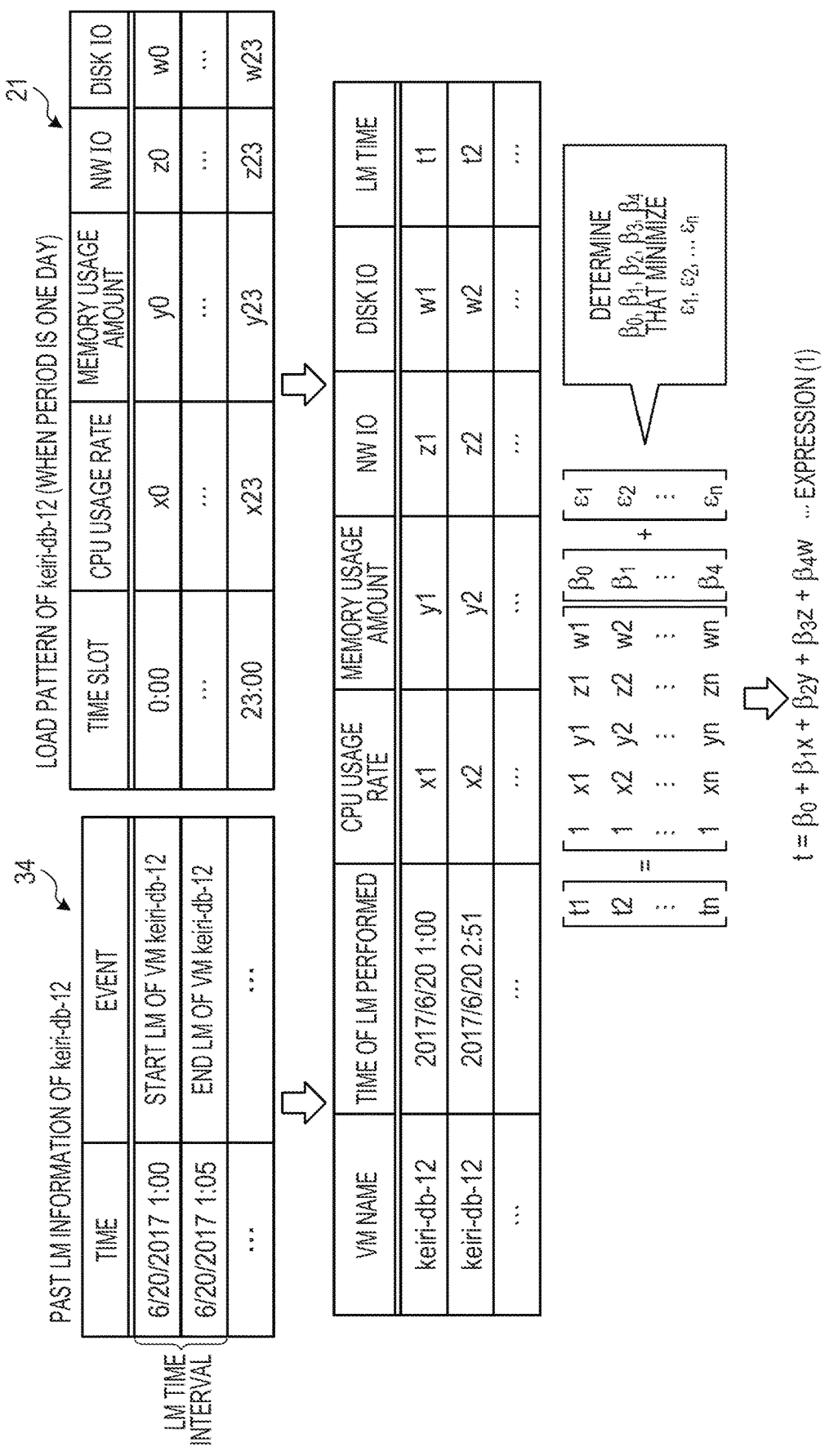
FIG. 6 is a flow diagram illustrating an example of prediction model generation processing.

Next, an example of prediction model generation processing will be described with reference to FIG. 6. FIG. 6 is a flow diagram illustrating an example of prediction model generation processing. In FIG. 6, the prediction model generation processing for the prediction model 22 for the VM with VM name of "keiri-db-12" will be described. As illustrated in FIG. 6, the prediction model generation unit 13 acquires the past LM information that indicates the times when live migration was performed in the past and the live migration time intervals for VM "keiri-db-12", which have been acquired by the information acquisition unit 11 from the LM log 34. The upper left of FIG. 6 illustrates the past LM information on VM "keiri-db-12". Also, the upper right of FIG. 6 illustrates the load pattern 21 of VM "keiri-db-12", generated by the load pattern generation unit 12.

The prediction model generation unit 13 then acquires from the past LM information the times when live migration was performed and the live migration time intervals for the VM "keiri-db-12". From the load pattern 21 for the VM "keiri-db-12", the prediction model generation unit 13 acquires load information corresponding to the times when live migration was performed. The load information is the CPU usage rate, memory usage amount, NW IO, and disk IO. The prediction model generation unit 13 then stores the times when live migration was performed, the load information, and the live migration time intervals in association with each other. In the middle of FIG. 6, each time when live migration was performed corresponds to the time of LM performed. The load information corresponds to the CPU usage rate, memory usage amount, NW IO, and disk IO. The live migration time intervals each corresponds to an LM time interval.

The prediction model generation unit 13 then performs multiple regression analysis by using the stored information with the load information serving as the explanatory variable and the time taken for live migration serving as the objective variable, and generates a prediction model 22 for a specific VM. Here, the CPU usage rate, memory usage amount, NW IO, and disk IO as the load information serve as the explanatory variables. The LM time interval serves as the objective variable. A multiple regression equation is determined so that Expression (1) is satisfied, where t is the LM time interval, x is the CPU usage rate, y is the memory usage amount, z is the NW IO, and w is the disk IO.

$$t=\beta_0+\beta_1 x+\beta_2 y+\beta_3 z+\beta_4 w \quad \text{Expression (1)}$$

For example, CPU usage rate x1, memory usage amount y1, NW IO z1, and disk IO w1 at the time "6/20/2017 1:00" when LM was performed are substituted for explanatory variables x, y, z, and w, and LM time interval t1 is substituted for objective variable t. CPU usage rate x2, memory usage amount y2, NW IO z2, and disk IO w2 at the time "6/20/2017 2:51" when LM was performed are substituted for explanatory variables x, y, z, and w, and LM time interval t2 is substituted for objective variable t. Then, $\beta_0$, $\beta_1$, $\beta_2$, $\beta_3$, and $\beta_4$ are identified so that substitution for the explanatory variables and the objective variable using all the stored information gives Expression (1), and a multiple regression equation is generated. In short, the generated multiple regression equation is the prediction model 22 for the VM "keiri-db-12".

Although the prediction model generation unit 13 uses multiple regression analysis to generate the prediction model 22, the multiple regression analysis may not be used if the relationship between the load information and the LM time intervals is determined. Although the CPU usage rate, memory usage amount, NW IO, and disk IO are described as the explanatory variables, the NW IO and the disk IO may be any information as the load information.

[Flowchart of Entire Prediction Model Generation Processing]

Figure 7:
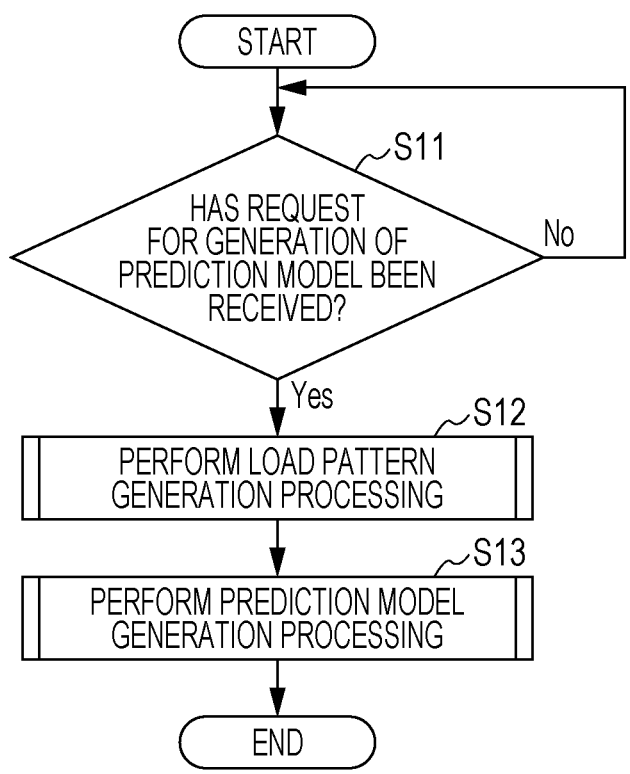
FIG. 7 is an example flowchart illustrating the entire prediction model generation processing according to the first embodiment.

FIG. 7 is an example flowchart illustrating the entire prediction model generation processing according to the first embodiment.

As illustrated in FIG. 7, the load pattern generation unit 12 determines whether or not a request to generate a prediction model has been received (step S11). It is to be noted that a request to generate a prediction model may be made, for instance, monthly or every two months. When it is determined that a request to generate a prediction model has not been received (No in step S11), the load pattern generation unit 12 repeats determination processing until the request is received.

On the other hand, when it is determined that a request to generate a prediction model has been received (Yes in step S11), the load pattern generation unit 12 performs the load pattern generation processing (step S12). The flowchart of the load pattern generation processing will be described later.

After the load pattern generation processing is performed, the prediction model generation unit 13 performs the prediction model generation processing by using the generated load pattern (step S13). The flowchart of the prediction model generation processing will be described later.

[Flowchart of Load Pattern Generation Processing]

Figure 8:
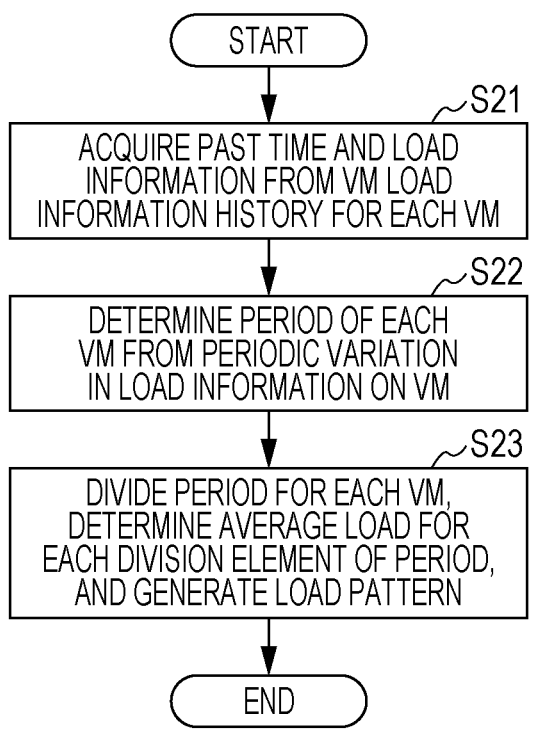
FIG. 8 is an example flowchart illustrating load pattern generation processing according to the first embodiment.

FIG. 8 is an example flowchart illustrating the load pattern generation processing according to the first embodiment.

As illustrated in FIG. 8, for each VM, the information acquisition unit 11 acquires the past times and load information from the VM load information history 35 (step S21). The load information is, for instance, a CPU usage rate, a memory usage amount, a NW IO, and a disk IO. The load pattern generation unit 12 then identifies the period of each VM from a periodic variation in the load information on the VM (step S22). The period is, for instance, one day period, one week period, one month period, or no period.

The load pattern generation unit 12 then divides the identified period for each VM by using the past times and load information acquired by the information acquisition unit 11, and generates a load pattern 21 that indicates average load information for each of division elements of the period (step S23). The load pattern generation unit 12 then completes the load pattern generation processing.

[Flowchart of Prediction Model Generation Processing]

Figure 9:
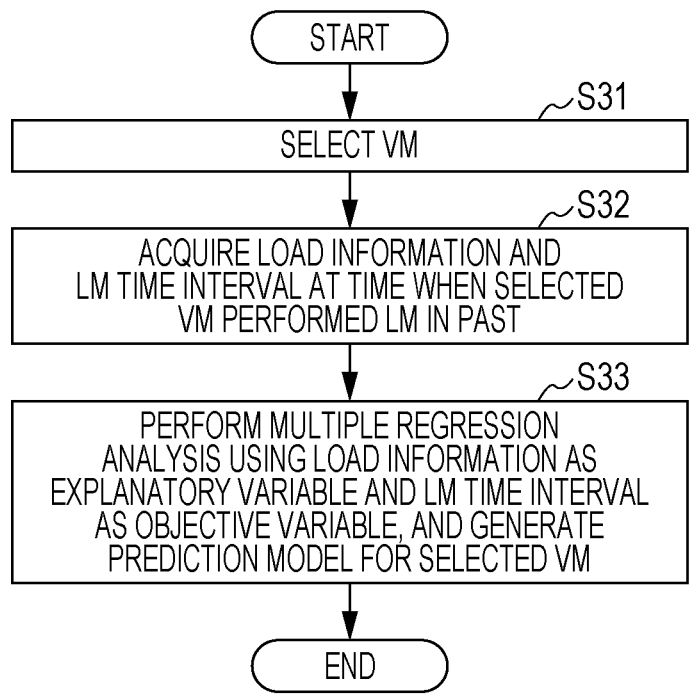
FIG. 9 is an example flowchart illustrating the prediction model generation processing according to the first embodiment.

FIG. 9 is an example flowchart illustrating the prediction model generation processing according to the first embodiment.

As illustrated in FIG. 9, the prediction model generation unit 13 selects a VM (step S31).

The prediction model generation unit 13 acquires the load information at the times when live migration (LM) was performed on the selected VM in the past, and the time intervals taken for LM (LM time intervals) (step S32). For instance, the prediction model generation unit 13 acquires the times when LM was performed and the LM time intervals acquired by the information acquisition unit 11 from the LM log 34. From the load pattern 21 for the selected VM, the prediction model generation unit 13 acquires the load information corresponding to the times when LM was performed.

The prediction model generation unit 13 then performs multiple regression analysis with the load information serving as the explanatory variable and the LM time interval serving as the objective variable, and generates a prediction model 22 for the selected VM (step S33). For instance, the prediction model generation unit 13 identifies $\beta_0$, $\beta_1$, $\beta_2$, $\beta_3$, and $\beta_4$ in Expression (1), and generates a multiple regression equation as the prediction model 22. The prediction model generation unit 13 then completes the prediction model generation processing for the selected VM.

[Flowchart of Prediction Processing]

Figure 10:
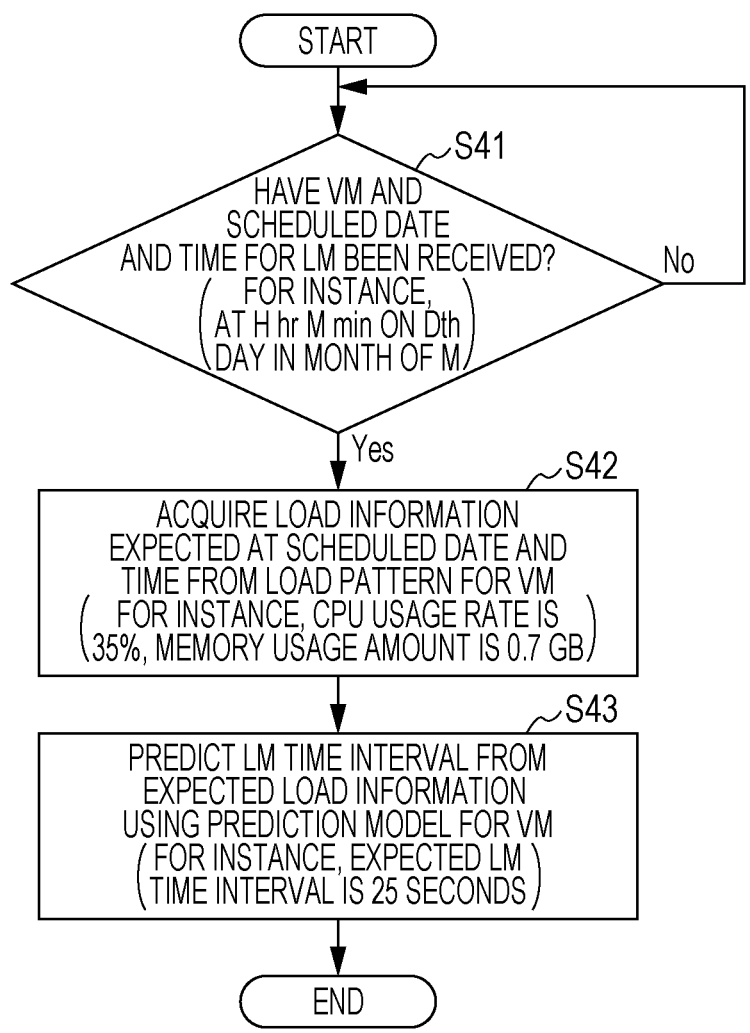
FIG. 10 is an example flowchart illustrating prediction processing according to the first embodiment.

FIG. 10 is an example flowchart illustrating prediction processing according to the first embodiment.

As illustrated in FIG. 10, the prediction unit 14 determines whether or not a VM and scheduled date and time at which live migration (LM) is performed have been received (step S41). For instance, the scheduled date and time is at H hr M min on the Dth day in the month of M. When it is determined that a VM and scheduled date and time at which live migration (LM) is performed have not been received (No in step S41), the prediction unit 14 repeats determination processing until a VM and scheduled date and time at which live migration (LM) is performed are received.

On the other hand, when it is determined that a VM and scheduled date and time at which live migration (LM) is performed have been received (Yes in step S41), the prediction unit 14 acquires the load information expected on the scheduled date and time from the load pattern 21 for the VM (step S42). For instance, it is assumed that the load information expected at H hr M min on the Dth day in the month of M is 35% as the CPU usage rate and 0.7 GB as the memory usage amount.

The prediction unit 14 then predicts the LM time interval from the expected load information by using the prediction model 22 for the VM (step S43). For instance, the prediction unit 14 predicts the LM time interval to be 25 seconds by substituting 35% as the CPU usage rate for x in Expression (1) and 0.7 GB as the memory usage amount for y in Expression (1). The prediction unit 14 then completes the prediction processing.

Effect of First Embodiment

According to the above-described embodiment, for each VM, the information provision apparatus 1 extracts load information at times when live migration was performed from the load history in which load information including CPU usage rates and memory usage amounts for each VM is stored with predetermined intervals. The information provision apparatus 1 generates and stores the prediction model 22 for predicting a live migration time interval for each VM, based on load information for each time when live migration was performed, and a time taken for live migration. When receiving an instruction for predicting a time interval of live migration of a predetermined VM, the information provision apparatus 1 predicts the live migration time interval from the stored prediction model 22 of the predetermined VM for predicting a live migration time interval. The information provision apparatus 1 provides a service provider with the predicted live migration time interval. With this configuration, the information provision apparatus 1 is able to predict a time interval taken for live migration in a public cloud.

In addition, according to the above-described embodiment, the information provision apparatus 1 determines the period of load information from the load history for each VM. The information provision apparatus 1 determines load information for every predetermined period, according to the period of load information determined for each VM, and generates a load pattern for each VM. For each VM, the information provision apparatus 1 extracts, from the load pattern, load information corresponding to times when live migration was performed. With this configuration, the information provision apparatus 1 extracts load information corresponding to times when live migration was performed, using the load pattern generated according to the period of the load information on each VM. Consequently, it is possible for the information provision apparatus 1 to generate the prediction model 22 for predicting a time taken for live migration of each VM.

Second Embodiment

In the first embodiment, it has been described that for each VM, the information provision apparatus 1 generates a prediction model 22 for predicting an LM time interval based on the load pattern 21 generated from the past load information and the LM time intervals when live migration (LM) was performed on the VM in the past. However, without being limited to this, the information provision apparatus 1 may group VMs having similar VM configuration 311 and load patterns 21 into one cluster, and perform the following processing. The information provision apparatus 1 generates a prediction model 22 for predicting an LM time interval, based on the load pattern 21 generated for each cluster and the LM time intervals when LM was performed on the VMs belonging to the cluster in the past. The purpose of performing clustering on the VMs is to improve the accuracy of prediction by increasing data because the frequency of LM of each VM is often low.

Thus, a case will be described where the information provision apparatus 1 according to the second embodiment forms VMs having similar VM configuration 311 and load patterns 21 into one cluster, and generates a prediction model 22 for predicting an LM time interval for each cluster.

[Configuration of Information Provision System According to Second Embodiment]

FIG. 11 is a functional block diagram illustrating the configuration of the information provision system according to the second embodiment. The same components as in the information provision apparatus 1 illustrated in FIG. 1 of the first embodiment are labeled with the same symbol, and a description of overlapping components and operations is omitted. The second embodiment differs from the first embodiment in that a cluster generation unit 41 and a clustering result 42 have been added. In addition, the second embodiment differs from the first embodiment in that the load pattern generation unit 12 has been changed to a load pattern generation unit 12A, and the prediction model generation unit 13 has been changed to a prediction model generation unit 13A.

The cluster generation unit 41 clusters multiple VMs which are managed by the same user.

For instance, the cluster generation unit 41 first acquires information on a VM managed by a predetermined user, using the user management table 313. When multiple pieces of information on the VM are acquired, the cluster generation unit 41 generates a load pattern 21 for each VM. It is to be noted that the load pattern 21 is generated by the load pattern generation unit 12A. The cluster generation unit 41 then classifies VMs according to the period of load identified when the load pattern 21 is generated for each VM. The period of load may be, for instance, one day period, one week period, one month period, or no period. For each period of load, the cluster generation unit 41 then calculates the distance between the load patterns 21 of VMs having the same period of load, and generates a cluster obtained from the load patterns 21. For instance, when the period is one day, the cluster obtained from the load patterns 21 may be a day type in which the load is higher than a predetermined threshold in the daytime, a night type in which the load is higher than a predetermined threshold in the nighttime, or no period type. Hereinafter, a description will be given under the assumption that when the period is one day, a cluster is a day type in which the load is higher than a predetermined threshold in the daytime, a night type in which the load is higher than a predetermined threshold in the nighttime, or no period type.

As an example, the Euclidean distance may be used for calculation of the distance between load patterns 21. For instance, an example of calculation of the distance between the load patterns 21 of VMa and VMb indicating two VMs will be described. It is assumed that the load information is the CPU usage rate, memory usage amount, NW IO, and disk IO. Let x be the CPU usage rate, y be the memory usage amount, z be the NW IO, and w be the disk IO. Then, the cluster generation unit 41 calculates a distance d(a, b) between the load patterns 21 of VMb and VMa using the Euclidean distance, where for instance, $a_{x0}$ is the CPU usage rate at 0:00 in VMa, and $a_{y0}$ is the memory usage amount at 0:00 in VMa.

$$d(a, b) = \sqrt{(a_{x0} - b_{x0})^2 + (a_{x1} - b_{x1})^2 + \ldots + (a_{x23} - b_{x23})^2 + (a_{y0} - b_{y0})^2 + \ldots + (a_{w23} - b_{w23})^2}$$

Expression (2)

Next, the cluster generation unit 41 groups multiple VMs managed by a predetermined user by clustering VMs having the same size using the VM configuration 311. The size refers to the number of VCPU cores and the memory size, for instance. In addition, the cluster generation unit 41 further groups the VMs belonging to a group of the same size by VM name. In other words, the cluster generation unit 41 generates a cluster obtained from the VM configuration 311. This is because it is expected that VMs having similar load patterns 21 also have similar VM names.

As an example, the Loewenstein distance may be used for grouping by VM name. For instance, the cluster generation unit 41 divides the names of VMs belonging to a group of the same size into word elements. The cluster generation unit 41 then calculates a Loewenstein distance, where the distance is defined by the number of different divided word elements between two VMs, and generates clusters of the VM configuration 311. In other words, the cluster generation unit 41 groups VMs having the same size and yet having dissimilar names into different clusters. The cluster generation unit 41 then generates a name pattern from the VM names belonging to the same cluster.

Next, the cluster generation unit 41 associates a load pattern with configuration by using the cluster obtained from the load pattern 21 and the cluster obtained from the VM configuration 311. As an example, the Bayesian estimation may be used for associating a load pattern with configuration. For example, when the cluster obtained from the load pattern 21 is a day type, the cluster generation unit 41 determines which configuration (a name pattern, a size type) in the cluster obtained from the VM configuration 311 is highly associated with the load pattern. The cluster generation unit 41 then sets the association between the load pattern and the configuration in the clustering result 42.

The load pattern generation unit 12A generates a load pattern 21 for each VM. In addition, the load pattern generation unit 12A generates a load pattern 21 for each cluster generated by the cluster generation unit 41. For example, the load pattern generation unit 12A generates a load pattern 21 for the association between the load pattern and the configuration set in the clustering result 42. Thus, for one cluster, the load pattern generation unit 12A generates a load pattern 21 of VM group belonging to the cluster.

For each cluster generated by the cluster generation unit 41, the prediction model generation unit 13A generates a prediction model 22 for predicting a time interval taken for live migration of each VM belonging to the cluster.

[Example of Cluster Generation Processing]

Here, an example of cluster generation processing will be described with reference to FIGS. 12A to 12D. FIGS. 12A to 12D are flow diagrams illustrating an example of cluster generation processing. It is to be noted that the cluster generation unit 41 is assumed to acquire information on multiple VMs managed by a specific user, using the user management table 313.

As illustrated in FIG. 12A, the cluster generation unit 41 generates a load pattern 21 for each VM related to the acquired information on multiple VMs. The load pattern 21 for each VM is generated by the load pattern generation unit 12A. The period of the load of the load pattern 21 is identified by the load pattern generation unit 12A. Here, the respective load patterns 21 of the VM "keiri-db-12", the VM "keiri-db-53", . . . are generated, and the period of load is assumed to be identified.

The cluster generation unit 41 then classifies VMs according to the period of load identified when the load pattern 21 is generated for each VM. In the case, the VMs "jinji-db-53", "keiri-db-12", "keiri-ana-44", "keiri-jimu-24", and "keiri-db-23" are classified into one day period.

For each period of load, the cluster generation unit 41 then calculates the distance between the load patterns 21 of VMs having the same period of load, and generates a cluster obtained from the load patterns 21. As an example, the Euclidean distance may be used for calculation of the distance between load patterns 21. Here, when the period of load is one day, the VMs "jinji-db-53" and "keiri-jimu-24" belong to the day type as the cluster obtained from the load pattern 21. The VM of "keiri-ana-44" belongs to the night type as the cluster obtained from the load pattern 21. The VMs of "keiri-db-12" and "keiri-db-23" belong to the no period type as the cluster obtained from the load pattern 21. Let A1 be these clusters obtained from the load pattern 21.

As illustrated in FIG. 12B, the cluster generation unit 41 groups multiple VMs managed by a predetermined user by clustering VMs having the same size using the VM configuration 311. The size refers to the number of VCPU cores and the memory size, for instance. Here, the VMs "keiri-db-12", "keiri-db-23", and "jinji-db-53" having a size type of C4M4 indicating 4 VCPUs and 4 GB memory form one group (see ○ symbol). The VM "keiri_jimu-24" having a size type of C4M2 indicating 4 VCPUs and 2 GB memory forms one group (see △ symbol). The VM "keiri_ana-44" having a size type of C8M4 indicating 8 VCPUs and 4 GB memory forms one group (see □ symbol).

As illustrated in FIG. 12C, the cluster generation unit 41 further groups the VMs belonging to a group of the same size by VM name. Here, the group of VMs having a size type of C4M4 will be described. The group of VMs having a size type of C4M4 includes the VMs "keiri_db-12", "keiri-db-23", "jinji-db-53". The cluster generation unit 41 divides each of the names of the VMs belonging to the group into word elements with hyphens. The VM name "keiri_db-12" is divided into word elements: "keiri", "db", and "12". The VM name "keiri_db-23" is divided into word elements: "keiri", "db", and "23". The VM name "jinji_db-53" is divided into word elements: "jinji", "db", and "53".

The cluster generation unit 41 then calculates a Loewenstein distance, where the distance is defined by the number of different divided word elements between two VMs. Here, "keiri_db-12" and "keiri-db-23" are calculated as 1. "keiri_db-12" and "jinji-db-53" are calculated as 2. "keiri_db-23" and "jinji-db-53" are calculated as 2.

The cluster generation unit 41 then generates clusters obtained from the VM configuration 311 using the calculated Loewenstein distance. Here, "keiri_db-12" and "keiri-db-23" indicating the distance of 1 are generated as the cluster obtained from one piece of VM configuration 311. The "jinji_db-53" indicating the distance of 2 is generated as the cluster obtained from one piece of VM configuration 311.

The cluster generation unit 41 then generates a name pattern from the VM names belonging to the same cluster. Here, the name pattern of "keiri_db-12" and "keiri-db-23" belonging to a cluster obtained from one piece of VM configuration 311 is generated as "keiri-db-??". The name pattern of "jinji-db-53" belonging to a cluster obtained from one piece of VM configuration 311 is generated as "jinji-db-??". "??" in each name pattern indicates any alphanumeric characters. Consequently, the VMs "keiri_db-12" and "keiri-db-23" belong to a cluster which is obtained from the VM configuration 311, and which has C4M4 as the size type of VM and "keiri-db-??" as the name pattern. The VM "jinji_db-53" belongs to a cluster which is obtained from the VM configuration 311, and which has C4M4 as the size type of VM and "jinji-db-??" as the name pattern. In other words, the cluster generation unit 41 sets VMs having the same size and yet having dissimilar names to different clusters. In addition, a cluster is generated, which is obtained from the VM configuration 311, and which has C4M2 as the size type of VM and "keiri-jimu-??" as the name pattern. A cluster is generated, which is obtained from the VM configuration 311, and which has C8M4 as the size type of VM and "keiri-ana-??" as the name pattern. Let A2 be these clusters obtained from the VM configuration 311.

The cluster generation unit 41 then stores each load pattern in association with VM names and configuration (the name pattern, the size type) using the cluster A1 obtained from the load pattern 21 and the cluster A2 obtained from the VM configuration 311.

Figure 12D:
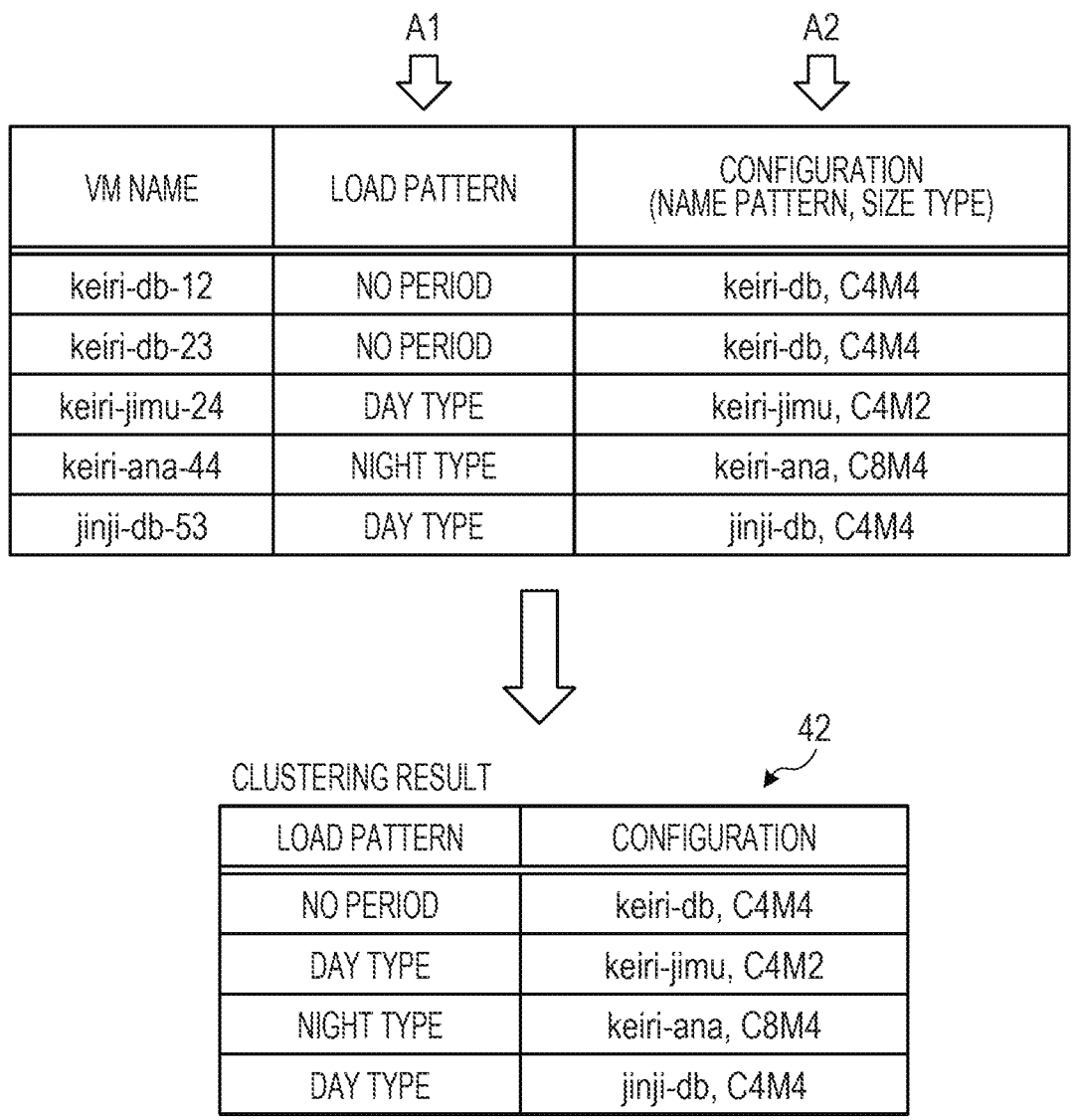
FIG. 12D is a flow diagram (4) illustrating an example of cluster generation processing.

As illustrated in FIG. 12D, the cluster generation unit 41 associates each load pattern and configuration with each other using the stored information. Configuration is estimated, which is associated with the load pattern of "no period", for instance. Configuration is estimated, which is associated with the load pattern of "day type", for instance. Configuration is estimated, which is associated with the load pattern of "night type", for instance. For instance, the Bayesian estimation may be used. As an example, an event A is defined as a situation where the load pattern is "no period", and an event B is defined as a situation where the configuration is "keiri-db". Then, let P(A) be the probability that the event A occurs, P(B) be the probability that the event B occurs, and P(B|A) be the probability of the event B after the event A has occurred. Then, P(B|A) is determined by the expression below. P(B) is the probability that the configuration of "keiri-db" occurs, and the probability is ⅖. P(A) is the probability that the configuration of "no period" occurs, and the probability is ⅖. P(A|B) is the probability of the event A (the load pattern is "no period") after the event B (the configuration is "keiri-db") has occurred, and the probability is 1. P(B|A)=P(A|B)×P(B)/P(A)=1×(⅖)/(⅖)=1

Consequently, when the event A occurs, the event B occurs with the probability of 1 (100%), thus the event A and the event B are associated with each other. When P(B|A) is not 1 but greater than or equal to a predetermined threshold, the event A and the event B may be associated with each other. For instance, the predetermined threshold may be greater than or equal to 0.9, may be 0.8, or may be determined empirically.

Consequently, the cluster generation unit 41 estimates configuration associated with the load pattern of "no period" as (keiri_db, C4M4). The cluster generation unit 41 estimates configuration associated with the load pattern of "day type" as (keiri_jimu, C4M2). The cluster generation unit 41 estimates configuration associated with the load pattern of "night type" as (keiri_ana, C8M4). The cluster generation unit 41 estimates configuration associated with the load pattern of "day type" as (jinji_db, C4M4). Association between the load pattern and the configuration results in one cluster. The cluster generation unit 41 then stores the association between the load pattern and the configuration as the clustering result 42.

[Flowchart of Entire Prediction Model Generation Processing]

Figure 13:
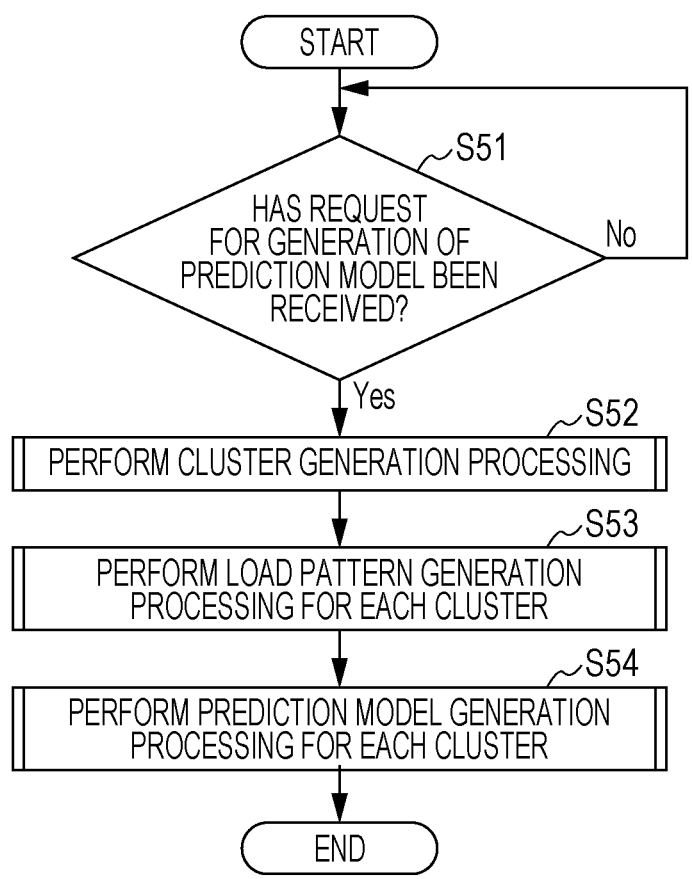
FIG. 13 is an example flowchart illustrating the entire prediction model generation processing according to the second embodiment.

FIG. 13 is an example flowchart illustrating the entire prediction model generation processing according to the second embodiment.

As illustrated in FIG. 13, the load pattern generation unit 12A determines whether or not a request to generate a prediction model has been received (step S51). It is to be noted that a request to generate a prediction model may be made, for instance, monthly or every two months. When it is determined that a request to generate a prediction model has not been received (No in step S51), the load pattern generation unit 12A repeats determination processing until the request is received.

On the other hand, when it is determined that a request to generate a prediction model has been received (Yes in step S51), the cluster generation unit 41 performs cluster generation processing (step S52). The flowchart of the cluster generation processing will be described later.

The load pattern generation unit 12A performs the load pattern generation processing for each cluster (step S53).

After the load pattern generation processing for each cluster is performed, the prediction model generation unit 13A performs prediction model generation processing for each cluster (step S54). The flowchart of the prediction model generation processing will be described later.

[Flowchart of Cluster Generation Processing]

Figure 14:
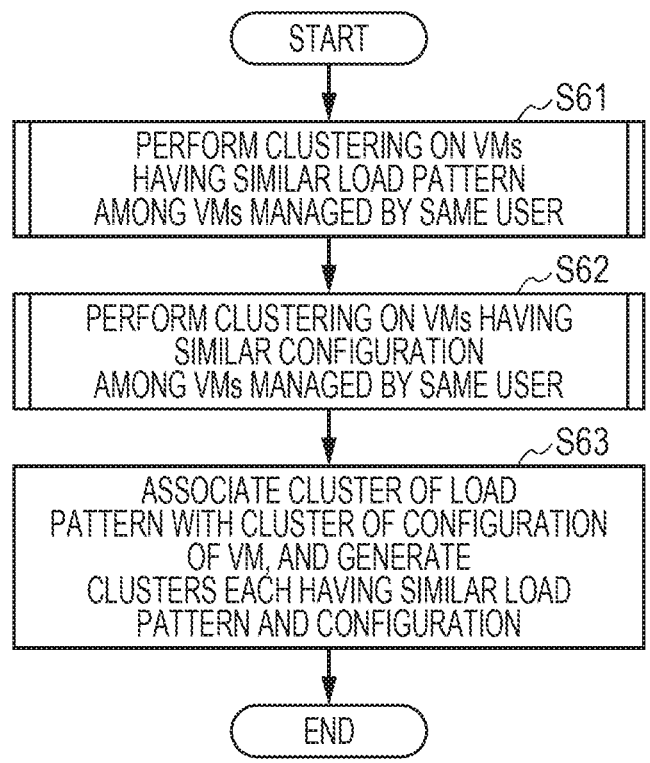
FIG. 14 is an example flowchart illustrating cluster generation processing according to the second embodiment.

FIG. 14 is an example flowchart illustrating cluster generation processing according to the second embodiment.

As illustrated in FIG. 14, the cluster generation unit 41 clusters VMs having similar load patterns among the VMs managed by the same user (step S61). The processing to cluster VMs having similar load patterns will be described later.

The cluster generation unit 41 clusters VMs having similar configuration among the VMs managed by the same user (step S62). The processing to cluster VMs having similar configuration will be described later.

The cluster generation unit 41 associates clusters obtained from the load pattern 21 and clusters of the configuration of VMs with each other, and generates clusters of VMs having similar load patterns and configuration (step S63). For instance, the cluster generation unit 41 associates clusters obtained from the load pattern 21 and clusters of the configuration of VMs with each other using the Bayesian estimation. The cluster generation unit 41 then completes the cluster generation processing.

[Flowchart of Processing to Cluster VMs Having Similar Load Patterns]

Figure 15:
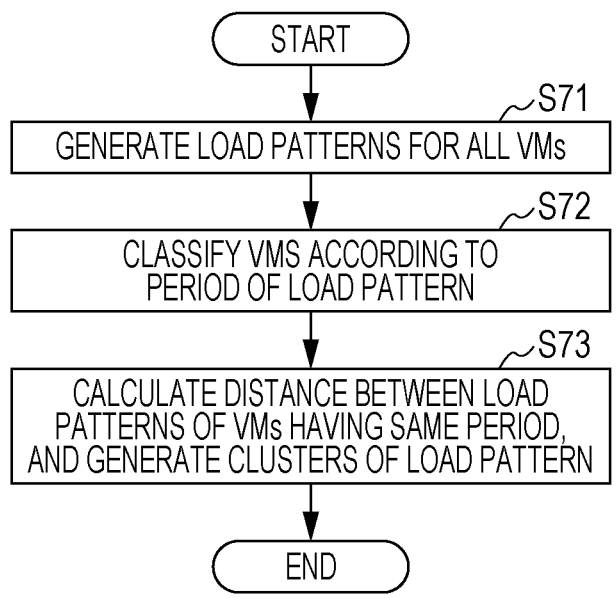
FIG. 15 is an example flowchart illustrating processing to cluster VMs having similar load patterns.

FIG. 15 is an example flowchart illustrating processing to cluster VMs having similar load patterns.

The load pattern generation unit 12A generates a load pattern 21 for all VMs managed by the same user (step S71).

The cluster generation unit 41 classifies VMs according to the period of the load pattern 21 (step S72). The cluster generation unit 41 then calculates the distance between the load patterns 21 of VMs having the same period, and generates clusters of the load patterns 21 (step S73). For instance, the cluster generation unit 41 calculates a distance between load patterns 21 using the Euclidean distance, for instance. For instance, when the period is one day, the clusters of the load pattern 21 are classified into the day type, the night type, and no period. The cluster generation unit 41 then completes the processing to cluster VMs having similar load patterns.

[Flowchart of Processing to Cluster VMs Having Similar Configuration]

Figure 16:
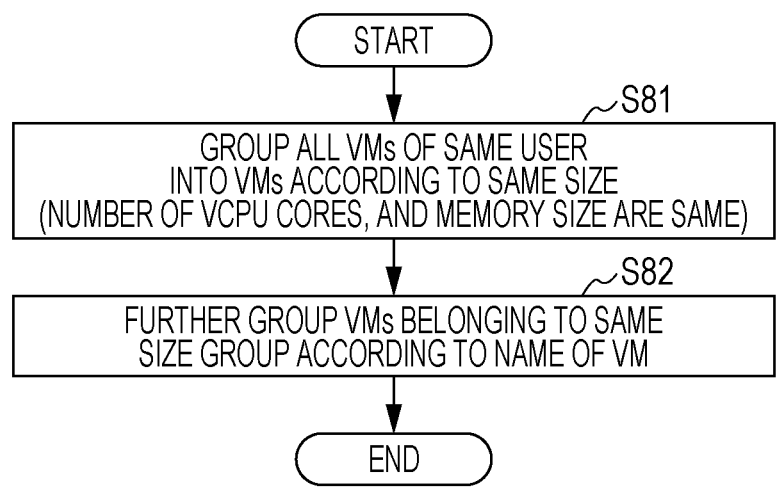
FIG. 16 is an example flowchart illustrating processing to cluster VMs having similar configuration.

FIG. 16 is an example flowchart illustrating processing to cluster VMs having similar configuration.

As illustrated in FIG. 16, the cluster generation unit 41 groups all VMs managed by the same user, by clustering VMs having the same size (step S81). The size refers to the number of VCPU cores and the memory size, for instance.

The cluster generation unit 41 further groups the VMs belonging to a group of the same size by VM name (step S82). For instance, the cluster generation unit 41 groups the VMs by VM name by using the Loewenstein distance. The cluster generation unit 41 then completes the processing to cluster VMs having similar configuration.

[Flowchart of Prediction Model Generation Processing]

Figure 17:
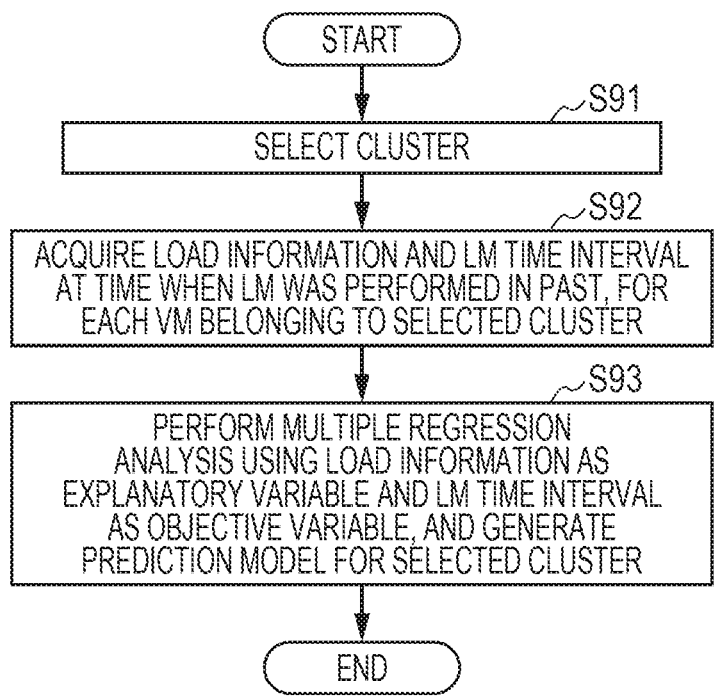
FIG. 17 is an example flowchart illustrating the prediction model generation processing according to the second embodiment.

FIG. 17 is an example flowchart illustrating the prediction model generation processing according to the second embodiment.

As illustrated in FIG. 17, the prediction model generation unit 13A selects a cluster (step S91).

For each VM belonging to a selected cluster, the prediction model generation unit 13A acquires the load information at the times when live migration (LM) was performed on the VM in the past, and the time intervals taken for LM (LM time intervals) (step S92). For instance, the prediction model generation unit 13A acquires the times when LM was performed and the LM time intervals acquired by the information acquisition unit 11 from the LM log 34. From the load pattern 21 for the VM belonging to the selected cluster, the prediction model generation unit 13A acquires the load information corresponding to the times when LM was performed.

The prediction model generation unit 13A then performs multiple regression analysis with the load information serving as the explanatory variable and the LM time interval serving as the objective variable, and generates a prediction model 22 for the selected VM (step S93). For instance, the prediction model generation unit 13A identifies $\beta_0$, $\beta_1$, $\beta_2$, $\beta_3$, and $\beta_4$ in Expression (1), and generates a multiple regression equation as the prediction model 22. The prediction model generation unit 13A then completes the prediction model generation processing for the selected cluster.

Effect of Second Embodiment

According to the above-described second embodiment, the information provision apparatus 1 groups VMs having similar load patterns and composition, and extracts load information at times when live migration was performed for each group. The information provision apparatus 1 generates a prediction model for each group from the extracted load information at the times and time intervals taken for live migration. With this configuration, the information provision apparatus 1 generates a prediction model using a group including multiple VMs having similar load patterns and composition, thereby making it possible to increase execution data of LM and to predict a time taken for live migration in a public cloud with high accuracy.

Third Embodiment

In the first embodiment, it has been described that for each VM, the information provision apparatus 1 generates a prediction model for predicting an LM time interval based on the load pattern 21 generated from the past load information and the LM time intervals when live migration (LM) was performed on the VM in the past. In the second embodiment, it has been described that the information provision apparatus 1 according to the second embodiment forms VMs having similar VM configuration 311 and load patterns 21 into one cluster, and generates a prediction model for predicting an LM time interval for each cluster. However, without being limited to this, when maintenance is performed on a PM in a predetermined period, the information provision apparatus 1 may schedule LM of a VM hosted by the PM by using the generated prediction model.

Thus, a case will be described where when maintenance is performed on a PM in a predetermined period, an information provision apparatus 1 according to a third embodiment schedules LM of a VM hosted by the PM by using a generated prediction model.

[Configuration of Information Provision Apparatus According to Third Embodiment]

Figure 18:
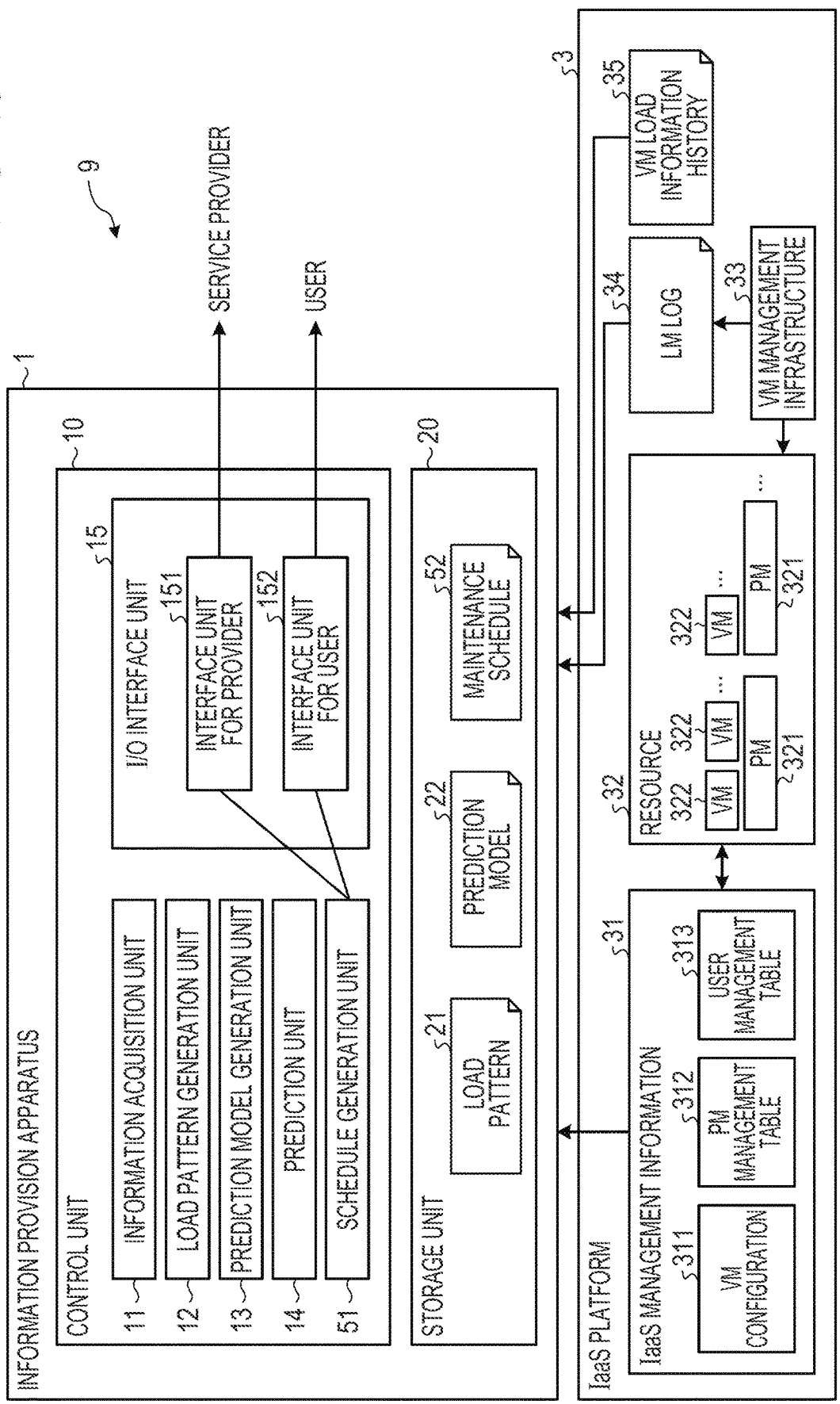
FIG. 18 is a functional block diagram illustrating the configuration of an information provision system according to a third embodiment.

FIG. 18 is a functional block diagram illustrating the configuration of an information provision apparatus according to a third embodiment. The same components as in the information provision apparatus 1 illustrated in FIG. 1 of the first embodiment are labeled with the same symbol, and a description of overlapping components and operations is omitted. The third embodiment differs from the first embodiment in that a schedule generation unit 51, a maintenance schedule 52, and an interface unit 152 for users have been added.

The maintenance schedule 52 is a live migration schedule for a VM hosted by PM when maintenance of the PM is performed. The maintenance of the PM is, for instance, upgrading the OS of the PM.

The interface unit 152 for users provides users via a network with the maintenance schedule 52 generated by the later-described schedule generation unit 51.

When maintenance is performed on a PM in a predetermined period, the schedule generation unit 51 schedules LM of a VM hosted by the PM by using a prediction model 22 generated by the prediction model generation unit 13.

For instance, when receiving a maintenance target PM and a maintenance period, the schedule generation unit 51 acquires the VM name of a VM hosted by the PM from the PM management table 312. For each VM name, the schedule generation unit 51 acquires the load information at each time point (time slot) during the maintenance period, by using the load pattern 21 for the VM indicated by the VM name. The schedule generation unit 51 predicts the time taken for LM of the VM at each time point (period prediction element) by using the prediction model 22 and the load information for the VM indicated by the VM name.

The schedule generation unit 51 then generates a maintenance schedule 52 during the maintenance period by using the time taken for LM of each VM at each time point (period prediction element) so that the LM time interval is the shortest. For instance, the schedule generation unit 51 may generate a maintenance schedule 52 during the maintenance period by using linear programming.

The schedule generation unit 51 then presents the generated maintenance schedule 52 during the maintenance period to users via the interface unit 152 for users.

[Example of Schedule Generation Processing]

Figure 19:
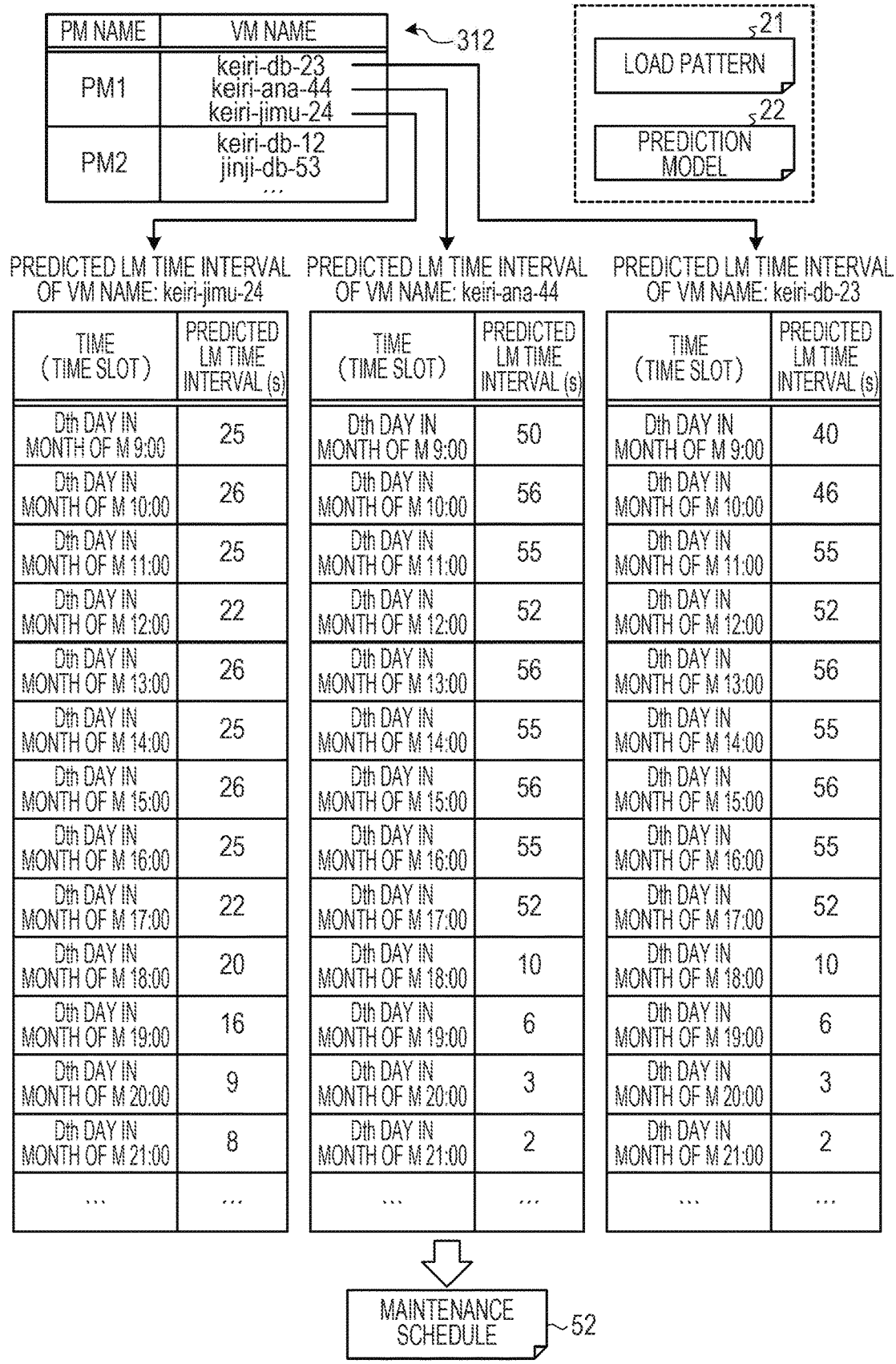
FIG. 19 is a flow diagram of an example of schedule generation processing.

Here, an example of schedule generation processing will be described with reference to FIG. 19. FIG. 19 is a flow diagram of an example of schedule generation processing. The schedule generation unit 51 is assumed to receive a maintenance target PM and a maintenance period.

As illustrated in FIG. 19, from the PM management table 312, the schedule generation unit 51 acquires the VM name of a VM hosted by the PM as the maintenance target. Here, assuming that "PM1" is the PM name of the maintenance target PM, "keiri-db-23", "keiri-ana-44", and "keiri-jimu-24" are acquired as the VM names managed by the "PM1" from the PM management table 312.

For each VM name, the schedule generation unit 51 acquires the load information at each time point (time slot) during the maintenance period by using the load pattern 21 for the VM indicated by the VM name. Here, the schedule generation unit 51 acquires the load information at each time point (time slot) during the maintenance period by using the load pattern 21 for "keiri-db-23". The schedule generation unit 51 acquires the load information at each time point (time slot) during the maintenance period by using the load pattern 21 for "keiri-ana-44". The schedule generation unit 51 acquires the load information at each time point (time slot) during the maintenance period by using the load pattern 21 for "keiri-jimu-24".

The schedule generation unit 51 then predicts the time taken for LM of the VM at each time point (time slot) by using the prediction model 22 for the VM indicated by the VM name and the load information at each time point (period prediction element) during the maintenance period for the VM. Here, the schedule generation unit 51 predicts the time taken for LM of "keiri-jimu-24" at each time point (period prediction element) by using the prediction model 22 for "keiri-jimu-24" and the load information at each time point (time slot) during the maintenance period for "keiri-jimu-24". As an example, when the time (time slot) is "9:00 on the Dth day in the month of M", predicted LM time interval is "25 seconds". The schedule generation unit 51 predicts the time taken for LM of "keiri-ana-44" at each time point (period prediction element) by using the prediction model 22 for "keiri-ana-44" and the load information at each time point (time slot) during the maintenance period for "keiri-ana-44". As an example, when the time (time slot) is "9:00 on the Dth day in the month of M", predicted LM time interval is "50 seconds". The schedule generation unit 51 predicts the time taken for LM of "keiri-db-23" at each time point (period prediction element) by using the prediction model 22 for "keiri-db-23" and the load information at each time point (time slot) during the maintenance period for "keiri-db-23". As an example, when the time (time slot) is "9:00 on the Dth day in the month of M", predicted LM time interval is "40 seconds".

The schedule generation unit 51 then generates a maintenance schedule 52 during the maintenance period by using the time taken for LM of each VM at each time (period prediction element) so that the LM time interval is the shortest. For instance, the schedule generation unit 51 may generate a maintenance schedule 52 during the maintenance period by using linear programming.

In the third embodiment, it has been described that when receiving a maintenance target PM and a maintenance period, the schedule generation unit 51 schedules LM of the VM hosted by the PM by using the prediction model 22 for the VM hosted by the PM. However, when receiving a maintenance target PM and a maintenance period, the schedule generation unit 51 may schedule LM of the VM hosted by the PM by using the prediction model 22 for the cluster to which the VM hosted by the PM belongs.

[Example of Presentation of Maintenance Schedule]

Figures 20A, 20B:
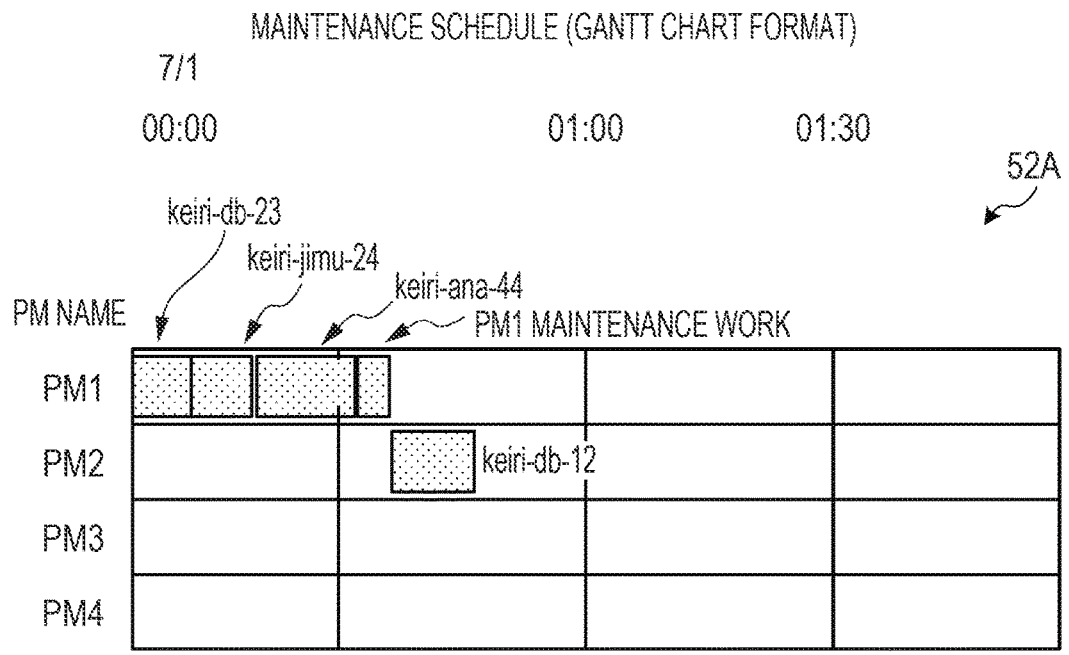
FIG. 20A is a table illustrating an example of presentation of a maintenance schedule.
FIG. 20B is a table illustrating another example of presentation of a maintenance schedule.

FIGS. 20A and 20B are tables illustrating an example of presentation of a maintenance schedule. In FIGS. 20A and 20B, it is assumed that the maintenance period is "0:00 and afterward on 7/1", and the maintenance targets are "PM1, PM2, PM3, and PM4".

FIG. 20A presents the maintenance schedule 52A in a Gantt chart format. Here, it is seen that LM is performed on "keiri-db-23", "keiri-jimu-24", and "keiri-ana-44" managed by PM1 in the order of "keiri-db-23", "keiri-jimu-24", and "keiri-ana-44". That is, LM is performed on "keiri-db-23", LM is performed on "keiri-jimu-24" after LM is performed on "keiri-db-23", and LM is performed on "keiri-ana-44" after LM is performed on "keiri-jimu-24". When PM1 is idle, the maintenance work of PM1 is performed. When the maintenance work of PM1 is completed, in order to make transition to the work of PM2, LM is performed on "keiri-db-12" managed by PM2. In this manner, the schedule generation unit 51 generates the maintenance schedule 52A to sequentially perform LM on VM in order to idle PM for all the PMs.

FIG. 20B presents the maintenance schedule 52B in a tabular format. Here, the maintenance starts at the scheduled time "0:10 on 7/1". LM from PM1 to PM2 is performed on "keiri-db-23" at the scheduled time "0:10 to 0:20 on 7/1". LM from PM1 to PM3 is performed on "keiri-jimu-24" at the scheduled time "0:20 to 0:22 on 7/1". LM from PM1 to PM4 is performed on "keiri-ana-44" at the scheduled time "0:22 to 0:28 on 7/1". The schedule time is such that when the LM time interval is not the shortest but load is higher for "keiri-ana-44". However, in order to make the entire LM time interval shortest, the LM time interval for "keiri-ana-44" is set at the scheduled time. Thus, "RESPONSE MAY BE REDUCED" is displayed as a possible effect. The maintenance work of PM1 is performed during the scheduled timet "0:28 to 0:33 on 7/1" when PM1 is idle. When the maintenance work of PM1 is completed, LM from PM2 to PM1 is performed on "keiri-db-12" at the scheduled time "0:33 to 0:43 on 7/1". The maintenance is completed at the scheduled time "6:58 on 7/1".

In this manner, the schedule generation unit 51 presents the maintenance schedule 52 to users, thereby allowing the users to grasp the situation of the entire maintenance schedule 52.

[Flowchart of Schedule Generation Processing]

Figure 21:
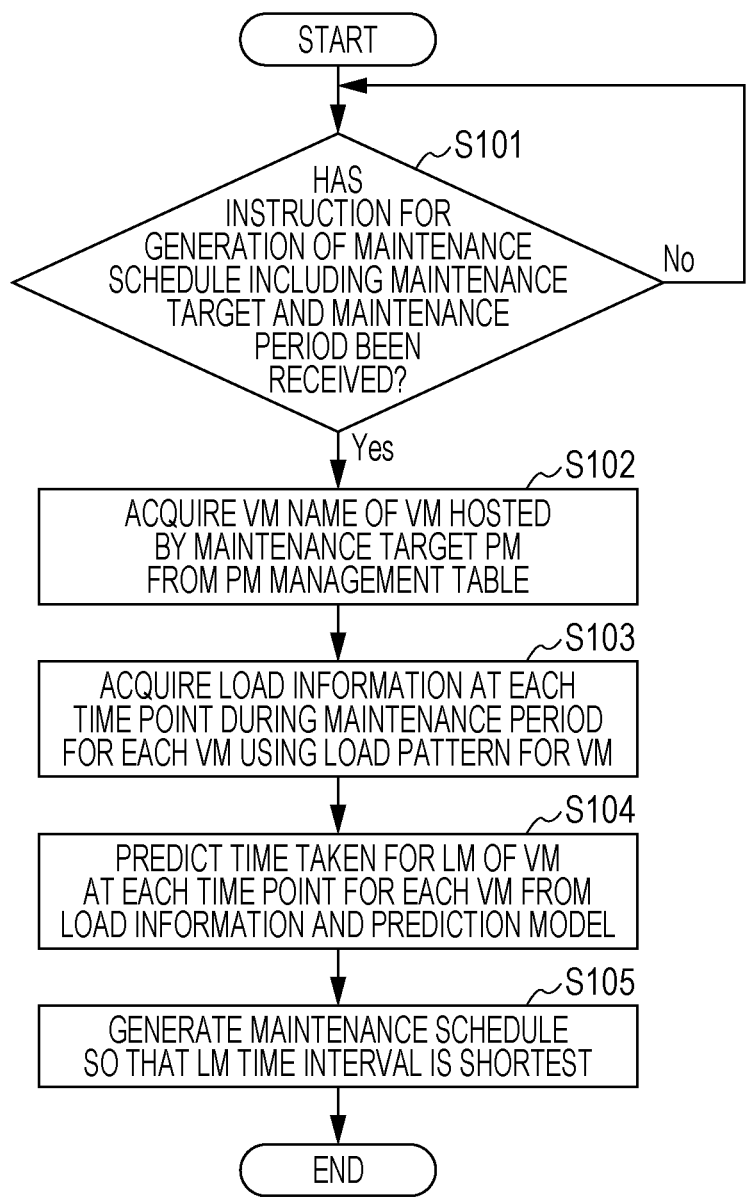
FIG. 21 is an example flowchart illustrating schedule generation processing according to the third embodiment.

FIG. 21 is an example flowchart illustrating schedule generation processing according to the third embodiment.

As illustrated in FIG. 21, the schedule generation unit 51 determines whether or not a request to generate a maintenance schedule including a maintenance target and a maintenance period has been received (step S101). When it is determined that a request to generate a maintenance schedule has not been received (No in step S101), the schedule generation unit 51 repeats determination processing until a request to generate a maintenance schedule is received.

On the other hand, when it is determined that a request to generate a maintenance schedule has been received (Yes in step S101), from the PM management table 312, the schedule generation unit 51 acquires the VM name of a VM hosted by the PM as the maintenance target (step S102). For each VM, the schedule generation unit 51 acquires the load information at each time point (period prediction element) during the maintenance period by using the load pattern 21 for the VM (step S103).

For each VM, the schedule generation unit 51 predicts the time taken for live migration (LM) of the VM at each time point (period prediction element) from the load information and the prediction model 22 (step S104). The schedule generation unit 51 generates the maintenance schedule 52 so that the LM time interval is the shortest (step S105). The schedule generation unit 51 then completes the schedule generation processing.

Effect of Third Embodiment

According to the above-described third embodiment, when maintenance is performed on a PM in a predetermined period, the information provision apparatus 1 predicts a time taken for live migration of VM mounted on a PM at each time during a predetermined period by using the prediction model 22 corresponding to the VM. The information provision apparatus 1 schedules the order of live migration of VMs in a predetermined period so that the total of the times taken for live migration is the smallest. With this composition, it is possible for the information provision apparatus 1 to predict the time taken for live migration of a VM mounted on a maintenance target PM in the maintenance period by using the prediction model 22 corresponding to the VM. Consequently, the information provision apparatus 1 is able to generate the maintenance schedule 52 of a maintenance target PM, based on the predicted time taken for live migration. It is possible for the information provision apparatus 1 to reduce the period of maintenance by generating the maintenance schedule 52.

Fourth Embodiment

In the third embodiment, it has been described that the schedule generation unit 51 presents the maintenance schedule 52 to users, for instance, in a Gantt chart format or a tabular format. However, without being limited to this, the schedule generation unit 51 may present the maintenance schedule 52 to users in a screen format.

[Example of Screen Presented to Users]

Figure 22:
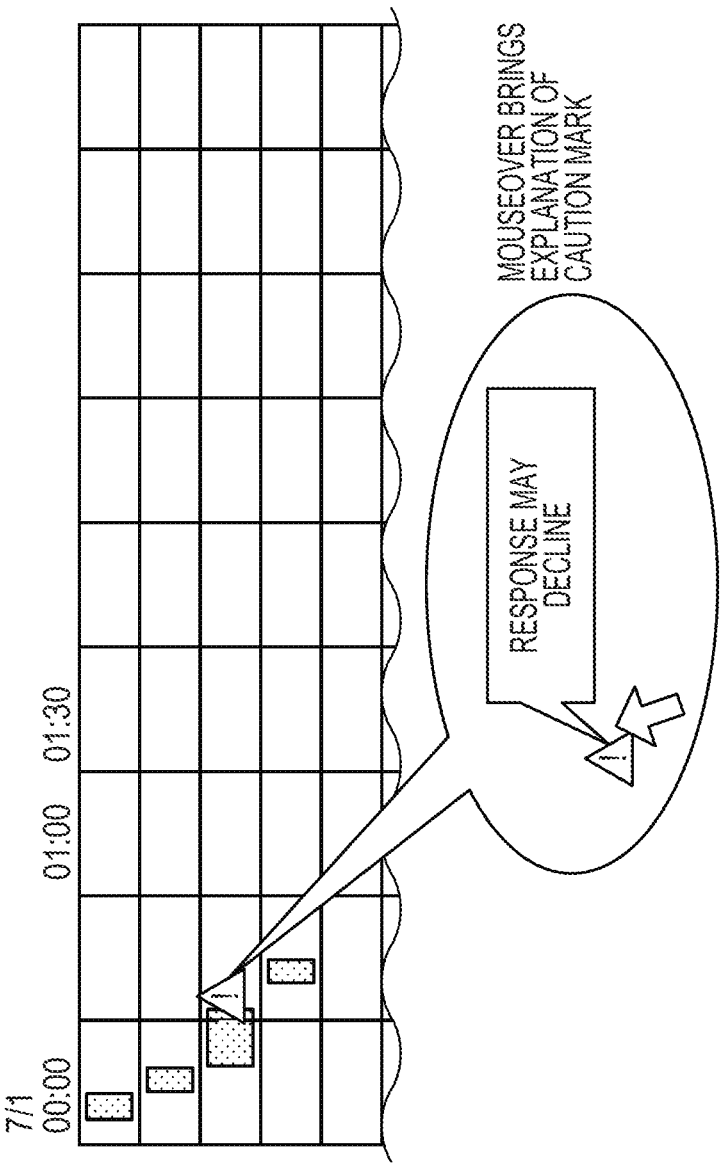
FIG. 22 is a view illustrating an example screen presented to a user according to a fourth embodiment.

FIG. 22 is a view illustrating an example screen presented to a user according to a fourth embodiment. The screen of FIG. 22 utilizes the information illustrated in FIGS. 20A and 20B.

As illustrated in FIG. 22, a notice of a periodic maintenance to a user is displayed in a Gantt chart format. A caution mark is displayed at the LM time interval for "keiri-ana-44". When a user has mouseover to the mark, explanation of the caution mark is displayed. Here, "RESPONSE MAY BE REDUCED" is displayed.

Effect of Fourth Embodiment

According to the above-described fourth embodiment, when live migration of a VM is predicted to affect the operations of some users as a result of the scheduling, the information provision apparatus 1 presents information to call attention to the users on the screen for each user of the VM. With this composition, it is possible for the information provision apparatus 1 to call attention to users who manages the VMs.

OTHERS

It is to be noted that in the first to fourth embodiments, the components of the illustrated apparatus do not have to be physically configured as illustrated. In other words, the specific configuration of distribution and integration of the apparatus is not limited to the illustrated configuration, and all or part of the apparatus may be functionally or physically distributed and integrated in any units and configured according to various loads and usage conditions. For instance, the load pattern generation unit 12 may be distributed to an identification unit that identifies the period of load from the past load information for each VM, a calculation unit that calculates load information for division elements which vary with the period of load, and a generation unit that generates the load pattern 21 indicating load information for each division element. Alternatively, the information acquisition unit 11 and the load pattern generation unit 12 may be integrated. The storage unit 20 may be coupled via a network as an external device of the information provision apparatus 1.

Figure 23:
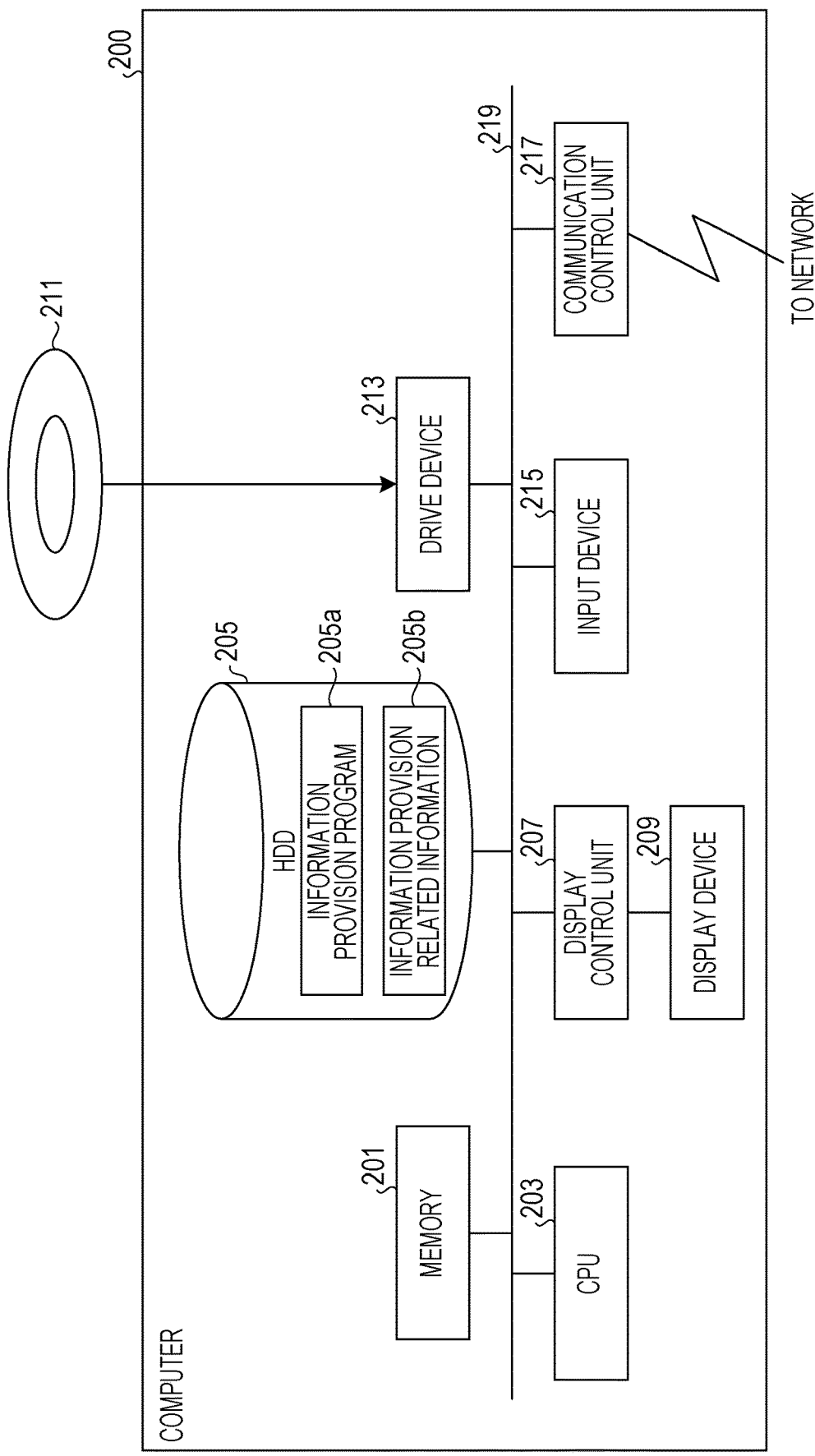
FIG. 23 is a diagram illustrating an example computer that executes an information provision program.

Also, the various types of processing described in the embodiments may be implemented by executing programs prepared in advance with a computer such as a personal computer or a workstation. Thus, hereinafter an example computer will be described, which executes an information provision program that achieves the same functions as those of the information provision apparatus 1 illustrated in FIG. 1. FIG. 23 is a diagram illustrating an example computer that executes an information provision program.

As illustrated in FIG. 23, a computer 200 includes a CPU 203 that executes various calculation processing, an input device 215 that receives input of data from a user, and a display control unit 207 that controls a display device 209. Also, the computer 200 includes a drive device 213 that reads a program or the like from a storage medium, and a communication control unit 217 that sends and receives data to and from other computers via a network. Also, the computer 200 includes a memory 201 that temporarily stores various information, and a HDD 205. The memory 201, the CPU 203, the HDD 205, the display control unit 207, the drive device 213, the input device 215, and the communication control unit 217 are coupled to each other via a bus 219.

The drive device 213 is a device for a removable disk 211, for instance. The HDD 205 stores an information provision program 205a and information provision related information 205b.

The CPU 203 reads the information provision program 205a, loads the program into the memory 201, and executes the program as a process. Such a process corresponds to each functional unit of the information provision apparatus 1. The information provision related information 205b corresponds to the load pattern 21 and the prediction model 22. For instance the removable disk 211 stores information such as the information provision program 205a.

It is to be noted that the information provision program 205a does not have to be stored in HDD 205 from the beginning. The program is stored, for instance, in a "portable physical medium" such as a flexible disk (FD), a CD-ROM, a DVD disk, a magneto-optical disk, an IC card which are to be inserted in the computer 200. From these media, the computer 200 may read and execute the information provision program 205a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:

extracting, for each of virtual machines, a first time at which a first live migration has been performed and a first time-interval that has been taken for the first live migration, from log information which stores events of the first live migration;

extracting, for each of the virtual machines, load information from a load history in which the load information including a CPU usage rate and a memory usage amount is stored at predetermined intervals for each of the virtual machines;

generating a model that predicts a second time-interval to be taken for a second live migration that is expected to be performed for each of the virtual machines, from the load information at the first time and the first time-interval;

upon receiving an instruction for predicting the second time-interval to be taken for the second live migration, predicting the second time-interval from the model; and providing the predicted second time-interval to be taken for the second live migration, when maintenance is performed on a first physical machine in a predetermined period, the second time-interval to be taken for the second live migration of each of first virtual machines mounted on the first physical machine is predicted at each of time points in the predetermined period by using the model corresponding to the each of the first virtual machines; and an order of the second live migrations of the first virtual machines in the predetermined period is scheduled so that a total of the second time-intervals to be taken for the second live migrations of the first virtual machines is smallest, when the scheduled order of the second live migrations of the first virtual machines is predicted to affect an operation of a user of a second virtual machine, information to call attention to the user is provided on a screen for the user of the second virtual machine.

2. The non-transitory, computer-readable recording medium of claim 1, wherein, in the extracting load information:

a period of load fluctuations is determined from the load history, for each of the virtual machines;

pieces of the load information are extracted at a predetermined interval that is determined according to the period of the load fluctuations, for each of the virtual machines;

a load pattern is generated for each of the virtual machines; and the load information corresponding to the first time is extracted from the load pattern, for each of the virtual machines.

3. The non-transitory, computer-readable recording medium of claim 2, wherein:

in the extracting load information, virtual machines whose load patterns and compositions are similar are classified into a group, and the load information at the first time is extracted for the group; and in the generating a model, the model for the group is generated from the pieces of the load information extracted at the predetermined interval and the first time-interval.

4. An apparatus comprising:

a processor coupled to a memory and configured to:

extract, for each of virtual machines, a first time at which a first live migration has been performed and a first time-interval that has been taken for the first live migration, from log information which stores events of the first live migration, extract, for each of the virtual machines, load information from a load history in which the load information including a CPU usage rate and a memory usage amount is stored at predetermined intervals for each of the virtual machines, generate a model that predicts a second time-interval to be taken for a second live migration that is expected to be performed for each of the virtual machines, from the load information at the first time and the first time-interval, upon reception of an instruction for predicting the second time-interval to be taken for the second live migration, predict the second time-interval from the model, and provide the predicted second time-interval to be taken for the second live migration; and the memory configured to store the log information and the load history, when maintenance is performed on a first physical machine in a predetermined period, the second time-interval to be taken for the second live migration of each of first virtual machines mounted on the first physical machine is predicted at each of time points in the predetermined period by using the model corresponding to the each of the first virtual machines; and an order of the second live migrations of the first virtual machines in the predetermined period is scheduled so that a total of the second time-intervals to be taken for the second live migrations of the first virtual machines is smallest, when the scheduled order of the second live migrations of the first virtual machines is predicted to affect an operation of a user of a second virtual machine, information to call attention to the user is provided on a screen for the user of the second virtual machine.

5. A method comprising:

extracting, for each of virtual machines, a first time at which a first live migration has been performed and a first time-interval that has been taken for the first live migration, from log information which stores events of the first live migration;

extracting, for each of the virtual machines, load information from a load history in which the load information including a CPU usage rate and a memory usage amount is stored at predetermined intervals for each of the virtual machines;

generating a model that predicts a second time-interval to be taken for a second live migration that is expected to be performed for each of the virtual machines, from the load information at the first time and the first time-interval;

upon receiving an instruction for predicting the second time-interval to be taken for the second live migration, predicting the second time-interval from the model; and providing the predicted second time-interval to be taken for the second live migration, when maintenance is performed on a first physical machine in a predetermined period, the second time-interval to be taken for the second live migration of each of first virtual machines mounted on the first physical machine is predicted at each of time points in the predetermined period by using the model corresponding to the each of the first virtual machines; and an order of the second live migrations of the first virtual machines in the predetermined period is scheduled so that a total of the second time-intervals to be taken for the second live migrations of the first virtual machines is smallest, when the scheduled order of the second live migrations of the first virtual machines is predicted to affect an operation of a user of a second virtual machine, information to call attention to the user is provided on a screen for the user of the second virtual machine.

* * * * *